(12) United States Patent
Morita et al.

(10) Patent No.: US 8,808,920 B2
(45) Date of Patent: Aug. 19, 2014

(54) POSITIVE ELECTRODE ACTIVE MATERIAL, POSITIVE ELECTRODE, NONAQUEOUS ELECTROLYTE CELL, AND METHOD OF PREPARING POSITIVE ELECTRODE ACTIVE MATERIAL

(71) Applicant: Sony Corporation, Tokyo (JP)

(72) Inventors: Koji Morita, Fukushima (JP); Yosuke Hosoya, Fukushima (JP); Satoshi Fujiki, Fukushima (JP); Kazunari Motohashi, Fukushima (JP); Guohua Li, Saitama (JP); Kazuaki Endoh, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/963,601

(22) Filed: Aug. 9, 2013

(65) Prior Publication Data

US 2013/0323596 A1 Dec. 5, 2013

Related U.S. Application Data

(63) Continuation of application No. 12/878,497, filed on Sep. 9, 2010, now Pat. No. 8,609,283.

(30) Foreign Application Priority Data

| Sep. 9, 2009 | (JP) | ................................. | 2009-208505 |
| Nov. 18, 2009 | (JP) | ................................. | 2009-263301 |
| Apr. 30, 2010 | (JP) | ................................. | 2010-105024 |
| Apr. 30, 2010 | (JP) | ................................. | 2010-105025 |

(51) Int. Cl.
*H01M 8/00* (2006.01)

(52) U.S. Cl.
USPC .................................. 429/231.95; 429/231.1

(58) Field of Classification Search
USPC ................. 429/231.95, 231.8, 221, 223, 224, 429/231.1, 231.3; 427/58
See application file for complete search history.

(56) References Cited

U.S. PATENT DOCUMENTS 6,372,385 B1 4/2002 Kweon et al.
6,730,435 B1 5/2004 Nakan et al.
(Continued)

FOREIGN PATENT DOCUMENTS

JP 4-169076 6/1992
JP 5-47383 2/1993
(Continued)

OTHER PUBLICATIONS

Japanese Patent Office, Notification of Reason(s) for Refusal issued in connection with Japanese Patent Application No. 2010-105024, dated Jan. 14, 2014. (13 pages).

(Continued)

*Primary Examiner* — Mark F Huff
*Assistant Examiner* — Monique Wills
(74) *Attorney, Agent, or Firm* — K&L Gates LLP

(57) ABSTRACT

Disclosed herein is a positive electrode active material prepared by mixing a lithium-containing compound, a compound containing a transition metal to be put into a solid solution, and a compound containing a metallic element M2 different from the transition metal, and firing the mixture to form composite oxide particles, depositing a compound containing at least one element selected from among sulfur (S), phosphorus (P) and fluorine (F) on surfaces of the particles, and firing the particles, whereby each of the particles is provided with a concentration gradient such that the concentration of the metallic element M2 increases from the center toward the surface of the particle, and at least one element selected from among (S), (P) and (F) is made present in the form of being aggregated at the surfaces of the composite oxide particles.

20 Claims, 4 Drawing Sheets

(56) References Cited

U.S. PATENT DOCUMENTS

| | | | |
|---|---|---|---|
| 7,364,793 | B2 | 4/2008 | Paulsen et al. |
| 2001/0031397 | A1 | 10/2001 | Kweon et al. |
| 2002/0071991 | A1 | 6/2002 | Kweon et al. |
| 2002/0076613 | A1 | 6/2002 | Lee et al. |
| 2003/0180615 | A1* | 9/2003 | Johnson et al. ............ 429/231.1 |
| 2008/0118839 | A1 | 5/2008 | Yamamoto et al. |
| 2009/0104532 | A1 | 4/2009 | Hosoya |
| 2010/0028768 | A1 | 2/2010 | Morita et al. |
| 2011/0042610 | A1* | 2/2011 | Cho et al. ................... 252/182.1 |

FOREIGN PATENT DOCUMENTS

| | | |
|---|---|---|
| JP | 7-235292 | 9/1995 |
| JP | 08-138670 | 5/1996 |
| JP | 2000-149950 | 5/2000 |
| JP | 2000-156227 | 6/2000 |
| JP | 2000-164214 | 6/2000 |
| JP | 2000-195517 | 7/2000 |
| JP | 3141858 | 12/2000 |
| JP | 3157413 | 2/2001 |
| JP | 3172388 | 3/2001 |
| JP | 3197763 | 6/2001 |
| JP | 2001-185146 | 7/2001 |
| JP | 2001-196063 | 7/2001 |
| JP | 2001-243948 | 9/2001 |
| JP | 2001-256979 | 9/2001 |
| JP | 2002-164053 | 6/2002 |
| JP | 2002-231227 | 8/2002 |
| JP | 2003-221235 | 8/2003 |
| JP | 2004-363097 | 12/2004 |
| JP | 2005-071680 | 3/2005 |
| JP | 3691279 | 6/2005 |
| JP | 2006-123572 | 11/2006 |
| JP | 2008-016235 | 1/2008 |
| JP | 2008-60033 | 3/2008 |
| JP | 2008-123972 | 5/2008 |
| JP | 2009-054583 | 3/2009 |
| JP | 2009-104805 | 5/2009 |
| JP | 2010-086922 | 4/2010 |
| JP | 2010-211925 | 9/2010 |
| KR | 10-0914406 | 8/2009 |
| WO | 01/04975 | 1/2001 |
| WO | 2006/123572 | 11/2006 |

OTHER PUBLICATIONS

Japanese Patent Office, Office action issued in connection with Japanese Patent Application No. 2010-105025, dated Jan. 14, 2014. (8 pages).

The State Intellectual Property Office of P.R.C., Notification of the Third Office Action issued in connection with P.R.C. Application No. 201010279232.7, dated Apr. 10, 2014. (16 pages).

\* cited by examiner

US 8,808,920 B2

POSITIVE ELECTRODE ACTIVE MATERIAL, POSITIVE ELECTRODE, NONAQUEOUS ELECTROLYTE CELL, AND METHOD OF PREPARING POSITIVE ELECTRODE ACTIVE MATERIAL

CROSS REFERENCES TO RELATED APPLICATIONS

The present application is a continuation of U.S. application Ser. No. 12/878,497, filed on Sep. 9, 2010, which claims priority to Japanese Priority Patent Applications JP2009-208505, JP2009-263301, JP2010-105024, and JP2010-105025 filed in the Japan Patent Office on Sep. 9, 2009, Nov. 18, 2009, Apr. 30, 2010, and Apr. 30, 2010, respectively, the entire content of which is hereby incorporated by reference.

BACKGROUND

The present application relates to a positive electrode active material, a positive electrode, a nonaqueous electrolyte cell, and a method of preparing a positive electrode active material. More particularly, the application relates to a positive electrode active material, a positive electrode, a nonaqueous electrolyte cell, and a method of preparing a positive electrode active material by which to realize a nonaqueous electrolyte cell having high performance and showing little capacity deterioration when subjected to charging and discharging in high-temperature environments. In detail, the present application relates to a positive electrode active material including lithium-transition metal composite oxide.

Attendant on spreading of portable apparatuses such as video cameras and notebook type personal computers, in recent years, there has been an increasing demand for small-sized high-capacity secondary cells and batteries. The secondary cells in use at present include the nickel-cadmium cell and the nickel-hydrogen cell, which use an alkaline electrolyte. These secondary cells, however, are disadvantageous in that the cell voltage is as low as about 1.2 V and it is difficult to enhance energy density. In view of this, nowadays, the lithium ion secondary cell which is higher in voltage than other cell systems and high in energy density has come into widespread use.

Due to its higher charged voltage as compared with other cell systems, however, the lithium ion secondary cell has a problem in that when used in such mode as to be left for a long time in a charged state, its capacity would be deteriorated and its useful life would be shortened. In addition, when the lithium ion secondary cell is used under high-temperature environmental conditions, a rise in internal resistance would proceed, making it very difficult to secure a sufficient capacity. Solution to these problems is keenly requested.

$LiCoO_2$, $LiNiO_2$ and other lithium-transition metal composite oxide particles are widely used as positive electrode active materials of Lithium-ion secondary batteries. Lately, various arts to improve the state of the particle surfaces to obtain better properties of the lithium-transition metal composite oxide particles by forming coating layer at the particle surfaces or diffusing some material from the particle surfaces have been proposed.

For example, in Japanese Patent No. 3197763 (hereinafter referred to as Patent Document 1), there is shown a method in which a metallic salt or hydroxide is added to a positive electrode. Besides, Japanese Patent Laid-open No. Hei 5-47383 (hereinafter referred to as Patent Document 2) shows a technology wherein a surface of lithium cobaltate ($LiCoO_2$) is coated with phosphorus (P). Japanese Patent No. 3172388 (hereinafter referred to as Patent Document 3) and Japanese Patent No. 3691279 (herein after referred to as Patent Document 4) shows a method in which a positive electrode active material or a surface of a positive electrode is coated with a metallic oxide.

Japanese Patent Laid-open No. Hei 7-235292 (hereinafter referred to as Patent Document 5), Japanese Patent Laid-open No. 2000-149950 (hereinafter referred to as Patent Document 6), Japanese Patent Laid-open No. 2000-156227 (hereinafter referred to as Patent Document 7), Japanese Patent Laid-open No. 2000-164214 (hereinafter referred to as Patent Document 8), Japanese Patent Laid-open No. 2000-195517 (hereinafter referred to as Patent Document 9), Japanese Patent Laid-open No. 2001-196063 (hereinafter referred to as Patent Document 10), Japanese Patent Laid-open No. 2002-231227 (hereinafter referred to as Patent Document 11), and the like show a method in which surfaces of particles are uniformly coated with a lithium-transition metal composite oxide and a method in which the composite oxide is diffused from the surfaces of particles. In addition, Japanese Patent Laid-open No. 2001-256979 (hereinafter referred to as Patent Document 12) shows a positive electrode active material in which lumps of a metallic oxide are deposited onto a metallic oxide layer. Japanese Patent Laid-open No. 2002-164053 (hereinafter referred to as Patent Document 13) shows a positive electrode active material in which at least one surface treatment layer containing at least two coating elements is formed on surfaces of cores which contain a lithium compound.

Japanese Patent No. 3157413 (hereinafter referred to as Patent Document 14) discloses a positive electrode active material in which a coating including a metallic fluoride is provided on surfaces of particles, and Japanese Patent No. 3141858 (hereinafter referred to as Patent Document 15) shows a coating which includes a crystalline metallic fluoride. In addition, Japanese Patent Laid-open No. 2003-221235 describes that the XPS (X-ray Photoelectron Spectroscopy) energy of fluorine on the surfaces of particles is specified. When the present inventors prepared the positive electrode active material by the method of mixing a metallic fluoride and heat-treating the mixture according to the disclosure, a practical effect on high-temperature preservability was observed, but the effect was limited to the effect on the surfaces of the particles and was insufficient on the basis of practical use performance. Further, U.S. Pat. No. 7,364,793 (hereinafter referred to as Patent Document 16) discloses a material obtained by a method in which a compound having high affinity for lithium and capable of supplying cations is brought into reaction with a lithium-transition metal composite oxide.

SUMMARY

However, according to the addition of an metallic salt or hydroxide to a lithium-transition metal oxide having a normal uniform form as in the method of Patent Document 1, the resistance of the electrode increased and it was very difficult to obtain a sufficient capacity. In the method of Patent Document 2, the lowering in capacity due to the coating was so large that the positive electrode active material was unsatisfactory for practical use. The method of Patent Documents 3 and 4 was unsatisfactory as a technique for enhancing cell performance in high-temperature environments, if use is made of only the coating element, coating method, and coating form disclosed in the document. Besides, it was found that increasing the coating amount in order to obtain a sufficient effect leads to hindrance of diffusion of lithium ions, making it very difficult to obtain a sufficient capacity at charge-discharge current values in practical-use ranges. Thus, the method was found unsatisfactory.

The method disclosed in Patent Document 4 to 9 was found unsatisfactory for enhancing cycle characteristics to a high extent and suppressing a rise in resistance during high-temperature use, though a high capacity can be maintained by the method. When a positive electrode active material was prepared by the method and structure disclosed in Patent Document 12, it was very difficult to obtain a sufficient charge-discharge efficiency, and the capacity was largely lowered. In the method of Patent Document 13, the effect owing to the method was limited if the surface treatment alone was adopted. Besides, when the positive electrode active material was actually prepared by the method disclosed in the document, a uniform multiple layer was formed, and the effect was not recognized, particularly, on a rise in resistance during high-temperature use.

As for the approach according to Patent Document 15, mere coating with a metallic fluoride being low in electronic conductivity and lithium ion conductivity resulted in a conspicuous lowering in charge-discharge performance, and its effect on charge-discharge characteristics in high-temperature environments was insufficient. When the present inventors prepared the positive electrode active material by the method disclosed in Patent Document 16, nonuniformity or slip-off of the material added as the coating material occurred, and inactive compounds such as oxides and lithium fluoride were produced, so that the coating function could not be exhibited sufficiently. In addition, it was very difficult to obtain charge-discharge performance on a practical-use level, because the migration of lithium ions at the charge-discharge times was hampered at the solid-liquid interface. Besides, there was also observed a tendency of lowering in capacity, because lithium was deprived from the lithium-transition metal composite oxide. Thus, the material according to the document was unsatisfactory.

Thus, there is a need for a positive electrode active material which is high in capacity, excellent in charge-discharge cycle characteristics and shows little deterioration when used in high-temperature environments, for a positive electrode and a nonaqueous electrolyte secondary cell using such a positive electrode active material, and for a method of preparing such a positive electrode active material.

According to an embodiment, there is provided a positive electrode active material prepared by:

mixing a lithium-containing compound, a compound containing a transition metal to be put into a solid solution, and a compound containing a metallic element M2 different from the transition metal, and firing the mixture to form composite oxide particles;

depositing a compound containing at least one element selected from among sulfur (S), phosphorus (P) and fluorine (F) on surfaces of the composite oxide particles; and firing the composite oxide particles with the compound containing at least one element selected from among sulfur (S), phosphorus (P) and fluorine (F) deposited thereon;

whereby each of the composite oxide particles is provided with a concentration gradient such that the concentration of the metallic element M2 increases from the center toward the surface of the composite oxide particle, and at least one element selected from among sulfur (S), phosphorus (P) and fluorine (F) is made present in the form of being aggregated at the surfaces of the composite oxide particles.

According to another embodiment, there is provided a positive electrode including a positive electrode material which is prepared by:

mixing a lithium-containing compound, a compound containing a transition metal to be put into a solid solution, and a compound containing a metallic element M2 different from the transition metal, and firing the mixture to form composite oxide particles;

depositing a compound containing at least one element selected from among sulfur (S), phosphorus (P) and fluorine (F) on surfaces of the composite oxide particles; and firing the composite oxide particles with the compound containing at least one element selected from among sulfur (S), phosphorus (P) and fluorine (F) deposited thereon;

whereby each of the composite oxide particles is provided with a concentration gradient such that the concentration of the metallic element M2 increases from the center toward the surface of the composite oxide particle, and at least one element selected from among sulfur (S), phosphorus (P) and fluorine (F) is made present in the form of being aggregated at the surfaces of the composite oxide particles.

According to a further embodiment, there is provided a nonaqueous electrolyte cell including a positive electrode, a negative electrode, and an electrolyte, wherein the positive electrode includes a positive electrode active material which is prepared by comprising:

mixing a lithium-containing compound, a compound containing a transition metal to be put into a solid solution, and a compound containing a metallic element M2 different from the transition metal, and firing the mixture to form composite oxide particles;

depositing a compound containing at least one element selected from among sulfur (S), phosphorus (P) and fluorine (F) on surfaces of the composite oxide particles; and firing the composite oxide particles with the compound containing at least one element selected from among sulfur (S), phosphorus (P) and fluorine (F) deposited thereon;

whereby each of the composite oxide particles is provided with a concentration gradient such that the concentration of the metallic element M2 increases from the center toward the surface of the composite oxide particle, and at least one element selected from among sulfur (S), phosphorus (P) and fluorine (F) is made present in the form of being aggregated at the surfaces of the composite oxide particles.

The compound containing at least one element selected from among sulfur (S), phosphorus (P) and fluorine (F) of the positive electrode active material, or the pyrolyzed, i.e., thermally decomposed product of the compound of the positive active material, of the positive electrode, and of the nonaqueous electrolyte cell of the present embodiment has preferably melting point of 70° C. or more and of 600° C. or less, and also has preferably the average diameter of 30 μm or less.

According to yet another embodiment, there is provided a method of preparing a positive electrode active material including:

mixing a lithium-containing compound, a compound containing a transition metal to be put into a solid solution, and a compound containing a metallic element M2 different from the transition metal, and firing the mixture to form composite oxide particles;

depositing a compound containing at least one element selected from among sulfur (S), phosphorus (P) and fluorine (F) on surfaces of the composite oxide particles; and firing the composite oxide particles with the compound containing at least one element selected from among sulfur (S), phosphorus (P) and fluorine (F) deposited thereon;

whereby each of the composite oxide particles is provided with a concentration gradient such that the concentration of the metallic element M2 increases from the center toward the surface of the composite oxide particle, and at least one element selected from among sulfur (S), phosphorus (P) and fluorine (F) is made present in the form of being aggregated at the surfaces of the composite oxide particles.

The compound containing at least one element selected from among sulfur (S), phosphorus (P) and fluorine (F) deposited on surfaces of the composite oxide particles is preferably melted or thermally decomposed and melted to exist uniformly on the surface of the composite oxide particles. It is also preferred that on the surface of the composite oxide particles cation of the compound containing at least one element selected from among sulfur (S), phosphorus (P) and fluorine (F) deposited on surfaces of the composite oxide particles is eliminated and anion of the compound is reacted with elements contained in the composite oxide particles.

Further, according to another embodiment, there is provided a positive electrode active material including lithium-transition metal composite oxide particles containing lithium, a principal transition metal M1, and a metallic element M2 different from the principal transition metal M1, the metallic element M2 having a concentration gradient of the metallic element M2 from the center toward the surface of each particle, wherein molar fraction r(%) satisfies the formula $0.20 \leq r \leq 0.80$ in the range where the ratio d(%) from the surface to a certain depth satisfies $0.020 \leq d \leq 0.050$, wherein ratio d(%)=[(mass of the principal transition metal M1)+(mass of metallic element M2)]/(mass of whole particles), and wherein molar fraction r=(mass of metallic element M2)/[(mass of principal transition metal M1)+(mass of metallic element M2)].

According to even another embodiment, there is provided a positive electrode active material including lithium-transition metal composite oxide particles containing lithium, a principal transition metal M1, and a metallic element M2 different from the principal transition metal M1, the metallic element M2 having a concentration gradient of the metallic element M2 from the center toward the surface of each particle, wherein molar fraction r(%) satisfies the formula $0.20 \leq r \leq 0.80$ in the range where the ratio d(%) from the surface to a certain depth satisfies $0.020 \leq d \leq 0.050$, where ratio d(%)=[(mass of the principal transition metal M1+(mass of metallic element M2)]/(mass of whole particles), and where molar fraction r=(mass of metallic element M2)/[(mass of principal transition metal M1)+(mass of metallic element M2)].

According to even another embodiment, there is provided a nonaqueous electrolyte cell including a positive electrode, a negative electrode, and an electrolyte, positive electrode including a positive electrode active material including lithium-transition metal composite oxide particles containing lithium, a principal transition metal M1, and a metallic element M2 different from the principal transition metal M1, the metallic element M2 having a concentration gradient of the metallic element M2 from the center toward the surface of each particle, wherein molar fraction r(%) satisfies the formula $0.20 \leq r \leq 0.80$ in the range where the ratio d(%) from the surface to a certain depth satisfies $0.020 \leq d \leq 0.050$, where ratio d(%)=[(mass of the principal transition metal M1)+(mass of metallic element M2)]/(mass of whole particles), and where molar fraction r=(mass of metallic element M2)/[(mass of principal transition metal M1)+(mass of metallic element M2)].

According to the present application, reaction at the positive electrode active material—electrolytic solution boundary is suppressed by controlling molar fraction r(%) to satisfy the formula $0.20 \leq r \leq 0.80$ in the range where the ratio d(%) from the surface to a certain depth satisfies $0.020 \leq d \leq 0.050$.

In the present application, each of composite oxide particles is provided with a concentration gradient such that the concentration of a metallic element M2 increases from the center toward the surface of the composite oxide particle, and at least one element selected from among sulfur (S), phosphorus (P) and fluorine (F) is present at surfaces of the composite oxide particles in the form of being aggregated on the surfaces of the composite oxide particles. Therefore, stabilization of the positive electrode active material and stabilization at the interfaces can be promised.

According to the present application, it is possible to realize a cell which is high in capacity, is excellent in charge-discharge cycle characteristics and shows little deterioration when used in high-temperature environments.

Additional features and advantages are described herein, and will be apparent from the following Detailed Description and the figures.

DETAILED DESCRIPTION

The present application will be described below with reference to the drawings according to an embodiment.

1. First embodiment (First example of nonaqueous electrolyte cell)

2. Second embodiment (Second example of nonaqueous electrolyte cell)

3. Third embodiment (Third example of nonaqueous electrolyte cell)

4. Fourth embodiment (Fourth example of nonaqueous electrolyte cell)

5. Fifth embodiment (Fifth example of nonaqueous electrolyte cell)

6. Other embodiment (Modification)

[Gist of the Present Invention]

Lithium-containing transition metal oxides such as lithium cobaltate ($LiCoO_2$) and lithium nickelate ($LiNiO_2$) are widely used as a positive electrode active material in lithium ion secondary cells. However, they have a problem as to stability in their charged state. Particularly, due to a rise in reactivity at the interface between the positive electrode active material and the electrolyte, the transition metal component would be eluted from the positive electrode, leading to deterioration of the active material or deposition of the eluted metal on the negative electrode side. As a result, occlusion and release of lithium (Li) would be hampered.

In addition, such a positive electrode active material as above-mentioned is considered to accelerate a decomposition reaction of the electrolyte at the interface, causing formation of a coating on the electrode surface or generation of a gas, which leads to deterioration of cell characteristics. Meanwhile, by conducting charging in such a manner as to attain a maximum charged voltage of at least 4.20 V, preferably at least 4.35 V, more preferably at least 4.40 V, in the condition where the positive electrode-negative electrode ratio is designed appropriately, it is possible to enhance energy density of the cell at the time of charging. It has been made clear, however, that where the charging voltage is raised and charge-discharge cycles are repeated in a high charged voltage condition of 4.25 V or higher, the above-mentioned deterioration of the active material or the electrolyte is accelerated, leading to a lowering in the charge-discharge cycle life or to deterioration of performance after storage at high temperature.

In view of this, the present inventors made intensive and extensive investigations. As a result of their investigations, they have found out that where a lithium-transition metal composite oxide with improved particle surfaces is used, the presence of a metallic compound on the particle surfaces produces a high synergistic effect or a novel effect on enhancement of cell characteristics. The present invention, which has been made based on the finding, aims at providing a positive electrode active material for lithium ion secondary cells which greatly enhances characteristics and reliability of the cells.

1. First Embodiment

First Example of Nonaqueous Electrolyte Cell

Figure 1:
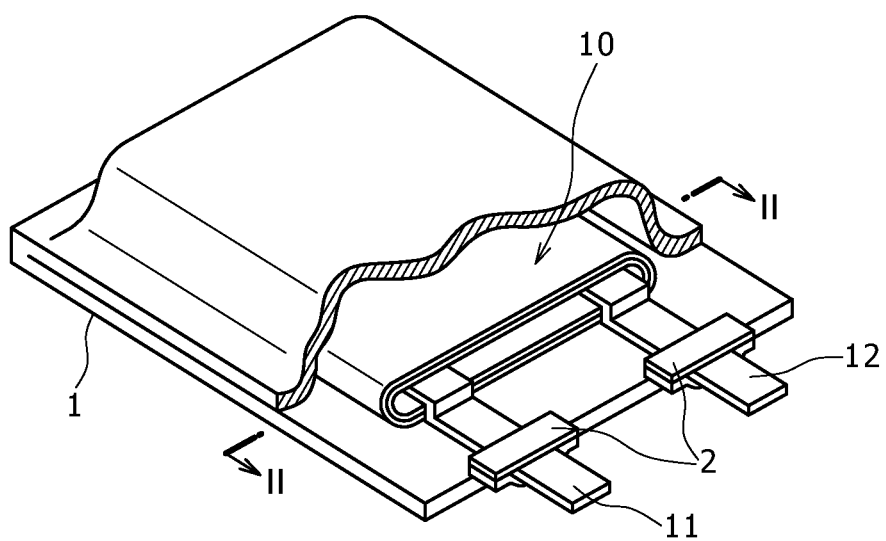
FIG. 1 is a perspective view showing a configuration example of a nonaqueous electrolyte cell according to an embodiment of the application.

FIG. 1 is a perspective view showing a configuration example of a nonaqueous electrolyte cell according to a first embodiment. The nonaqueous electrolyte cell is, for example, a nonaqueous electrolyte secondary cell. The nonaqueous electrolyte cell, flat in overall shape, has a configuration in which a wound electrode body 10 fitted with a positive electrode lead 11 and a negative electrode lead 12 is accommodated in the inside of film formed casing members 1.

The positive lead 11 and the negative lead 12 are each, for example, rectangular plate-like in shape, and they are lead out from the inside toward the outside of the casing members 1 in the same direction, for example. The positive electrode lead 11 is made of a metallic material such as aluminum (Al), for example, and the negative electrode lead 12 is made of a metallic material such as nickel (Ni), for example.

The casing members 1 are each composed, for example, of a laminate film having a structure in which an insulating layer, a metallic layer and an outermost layer are stacked in this order and adhered to one another by lamination or the like. The casing members 1 are, for example, so configured that the insulating layer side is set on the inner side, and each pair of outer edge portions are secured to each other by fusing or by use of an adhesive.

The insulating layer is composed, for example, of a polyolefin resin such as polyethylene, polypropylene, modified polyethylene, modified polypropylene, and their copolymers. Such a polyolefin resin promises a low water permeability and is excellent in gas-tightness. The metallic layer is composed of a foil-shaped or sheet-shaped member of aluminum, stainless steel, nickel, iron or the like. The outermost layer may, for example, be composed of a similar resin to that of the insulating layer, or be composed of nylon or the like. Such a material promises a high strength against rupture or piercing. The casing member 1 may further have other layer than the above-mentioned insulating layer, metallic layer, and outermost layer.

Between the casing member 1 and each of the positive electrode lead 11 and the negative electrode lead 12, an adhesion film 2 is inserted for enhancing the adhesion of each of the positive electrode lead 11 and the negative electrode lead 12 to the inside of the casing member 1 and for preventing penetration of outside air. The adhesion film 2 is formed of a material which has a property for adhesion to (secure contact with) each of the positive electrode lead 11 and the negative electrode lead 12. Where the positive electrode lead 11 and the negative electrode lead 12 are composed of the above-mentioned metallic materials, the adhesion film 2 is preferably formed, for example, of a polyolefin resin such as polyethylene, polypropylene, modified polyethylene, modified polypropylene, etc.

Figure 2:
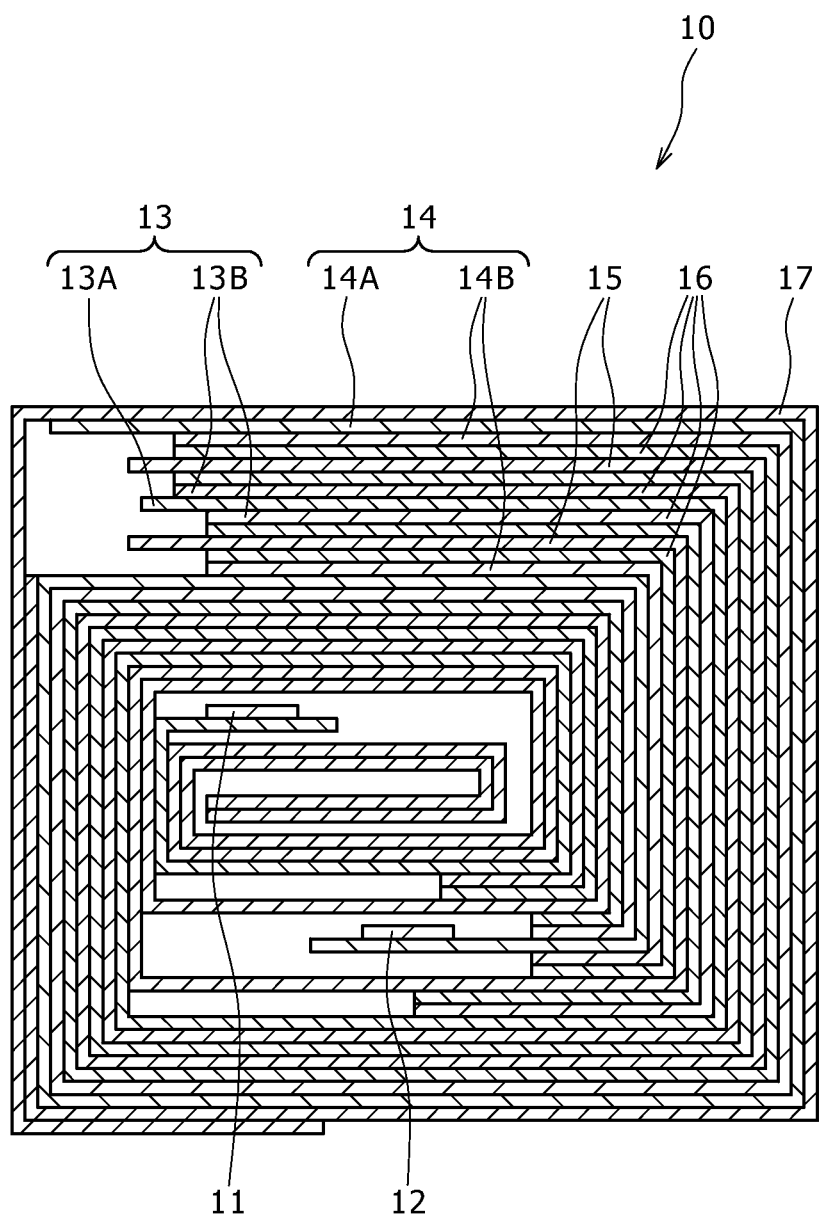
FIG. 2 is a sectional view, taken along line II-II of FIG. 1, of a wound electrode body shown in FIG. 1.

FIG. 2 is a sectional view, taken along line II of FIG. 1, of the wound electrode body 10 shown in FIG. 1. The wound electrode body 10 has a structure in which a positive electrode 13 and a negative electrode 14 are stacked together, with a separator 15 and an electrolyte 16 therebetween, and an outermost peripheral portion of which is protected by a protective tape 17.

[Positive Electrode]

The positive electrode 13, for example, has a positive electrode current collector 13A, and positive electrode active material layers 13B provided respectively on both sides of the positive electrode current collector 13A. Positive electrode active material layer may be provided only one side of the positive electrode current collector 13A. As the positive electrode current collector 13A, for example, a metallic foil such as an aluminum foil can be used.

The positive electrode active material layer 13B includes, as positive electrode active material, one or more than two sorts of positive materials capable of occlusion and release electrode reaction substance. The positive electrode active material layer 13B, further, includes a conduction adjuvant such as a carbon material, and a binder such as polyvinylidene fluoride or polytetrafluoroethylene.

[Positive Electrode Active Material]

The positive electrode active material is, for example, composite oxide particles which contain therein a metallic element M2 different from a principal transition metal M1 and which have a concentration gradient of the metallic element M2 from the center toward the surface of each particle. The concentration gradient is such that the concentration of the metallic element M2 increases as the particle surface is approached. The composite oxide particles are particles of a lithium-containing transition metal composite oxide wherein at least one element X selected from among sulfur (S), phosphorus (P) and fluorine (F) is present in an aggregated form at the surfaces of the composite oxide particles. Incidentally, the state of the lithium-transition metal composite oxide surface can be confirmed by observation of the obtained powder under SEM/EDX (Scanning Electron Microscopy/Energy Dispersive X-ray spectrometer).

The metallic element M2 is not particularly limited. It is preferable, however, that the composite oxide particles are particles of a lithium-containing transition metal composite oxide prepared by a process wherein the metallic element M2 is preliminarily caused to be present inside the composite oxide particles, and the metallic element M2 is allowed to react with a compound containing at least one element x selected from among sulfur (S), phosphorus (P) and fluorine (F) to raise the concentration of the metallic element M2 at the particle surfaces.

Thus, the metallic element M2 is preliminarily distributed uniformly inside the composite oxide particles and then the concentration of the metallic element M2 at the particle surfaces is raised, whereby the metallic element M2 can be made to be present uniformly at the particle surfaces. Consequently, a modifying effect of the metallic element M2 on the particle surfaces can be displayed to the utmost.

The metallic element M2 is preferably at least one element that can replace, on a solid solution basis, the principal transition metal element M1 in the inside of the composite oxide particles. More preferably, the metallic element M2 is at least one element selected from the group consisting of manganese (Mn), magnesium (Mg), aluminum (Al), nickel (Ni), boron (B), titanium (Ti), cobalt (Co) and iron (Fe). It is effective for the metallic element M2 to be present at the particle surfaces in the state of having replaced the principal transition metal element A or in the state of having diffused into the inside near the surfaces of the particles to show a continuous concentration gradient toward the center of each particle.

Incidentally, the concentration of magnesium can be confirmed by cutting a section of the lithium-transition metal composite oxide and measuring the element distributions in the radial direction by Auger electron spectroscopy.

Further, the reaction of the metallic element M2 with the compound containing at least one element selected from among sulfur (S), phosphorus (P) and fluorine (F) conducted for raising the concentration of the metallic element M at the particle surfaces is preferably carried out in the co-existence of a lithium (Li) compound. Where the reaction is carried out in the co-existence of the Li compound, it is possible to regulate the amount of Li in the lithium-containing composite oxide and to suppress the lowering in capacity due to the surface modification.

As the lithium-transition metal composite oxide in the inside of the particles, one of various known materials can be used. Preferably, however, the lithium-transition metal composite oxide is a material which has a laminar rock salt structure and the principal transition metal element A as a constituent of which is at least selected from among nickel (Ni), cobalt (Co), manganese (Mn) and iron (Fe). Such a material promises a high capacity. Besides, known materials in which small amounts of additive elements have been introduced as substituents, on a solid solution basis, can also be used.

Incidentally, the composite oxide particles serving as a base material for the positive electrode are, for example, lithium composite oxide particles having a laminar rock salt structure and an average composition represented by the following chemical formula (Chemical 1). The lithium composite oxide particles may be primary particles or may be secondary particles.

$$Li_a A_b M_{1-b} O_c \quad \text{(Chemical 1)}$$

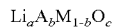

In the formula, M is preferably at least one element selected from among manganese (Mn), magnesium (Mg), aluminum (Al), nickel (Ni), boron (B), titanium (Ti), cobalt (Co) and iron (Fe); a, b and c are numbers in the ranges of $0.2 \leq a \leq 1.4$, $0 \leq b \leq 1.0$, and $1.8 \leq c \leq 2.2$; and, incidentally, the compositional ratio of lithium varies depending on the charged/discharged state, the value of a shown here representing the value in a fully discharged state.

In the chemical formula (Chemical 1), the range of the value of a is, for example, $0.2 \leq a \leq 1.4$. If the value of a is too small, the laminar rock salt structure as the basic crystal structure of the lithium composite oxide would be collapsed, whereby recharging would be made difficult to achieve and the capacity would be lowered considerably. If the value of a is too large, on the other hand, lithium would diffuse to the outside of the composite oxide particles, obstructing the control of basicity in the subsequent process step and, finally, causing a trouble as to promotion of gelation during kneading of a positive electrode paste.

Incidentally, the lithium composite oxide in the above formula (Chemical 1) is so set that lithium may be contained in excess of its amount according to the related art. Specifically, the value of a, which represents the proportion of lithium in the lithium composite oxide of the above formula (Chemical 1), may be greater than 1.2. Here, the value of 1.2 has been disclosed as the compositional ratio of lithium in this type of lithium composite oxide in the related art, and, due to the same crystal structure as in the case of a=1, gives a working-effect equivalent to that in the present application (refer to, for example, the present applicant's previous application: Japanese Patent Laid-open No. 2008-251434).

Even when the value of a representing the compositional ratio of lithium in the lithium composite oxide of the above formula (Chemical 1) is greater than 1.2, the crystal structure of the lithium composite oxide is the same as in the case where the value of a is not more than 1.2. Besides, even when the value of a representing the compositional ratio of lithium in the above formula (Chemical 1) is greater than 1.2, if the value is not more than 1.4, the chemical states of the transition metal constituting the lithium composite oxide in oxidation-reduction reactions attendant on the charge-discharge cycle are not much different from those in the case where the value of a is not more than 1.2.

The range of the value of b is, for example, $0 \leq b \leq 1.0$. If the value of b is reduced to below this range, the discharge capacity of the positive electrode active material would be lowered. If the value of b is increased to above this range, on the other hand, stability of the crystal structure of the composite oxide particles would be lowered, causing a lowering in the charge-discharge repetition capacity of the positive electrode active material and a lowering in safety.

The range of value of c is, for example, $1.8 \leq c \leq 2.2$. In the case where the value of c is below this range and in the case where the value is above this range, stability of the crystal structure of the composite oxide particles would be lowered, causing a lowering in the charge-discharge repetition capacity of the positive electrode active material and a lowering in safety, and resulting in a reduction in the discharge capacity of the positive electrode active material.

[Particle Diameter]

The positive electrode active material preferably has an average particle diameter of 2.0 to 50 µm. If the average particle diameter is less than 2.0 µm, exfoliation of a positive electrode active material layer would occur at the time of pressing the positive electrode active material layer during production of the positive electrode. In addition, due to an increased surface area of the positive electrode active material, it is necessary to increase the amounts of the conductivity adjuvant and the binder added, so that the energy density per unit weight tends to be lowered. If the average particle diameter exceeds 50 µm, on the other hand, the particles tend to penetrate the separator, causing short-circuit.

The positive electrode 13 as above preferably has a thickness of not more than 250 µm.

[Negative Electrode]

The negative electrode 14, for example, has a negative electrode current collector 14A, and negative electrode active material layers 14B provided respectively on both sides of the negative electrode current collector 14A. Negative electrode active material layer 14b may be provided only one side of the negative electrode current collector 13A. The negative electrode current collector 14A is composed, for example, a metallic foil such as a copper foil.

The negative electrode active material layer 14B is configured, for example, to contain as a negative electrode active material at least one negative electrode material capable of occlusion and release of lithium, and may contain a conductivity adjuvant and/or a binder, as required.

Examples of the negative electrode material capable of occlusion and release of lithium include carbon materials such as graphite, hardly graphitizable carbon or easily graphitizable carbon, which may be used either singly or in mixture of two or more of them. Besides, two or more such materials differing in average particle diameter may be used in mixture.

Other examples of the negative electrode material capable of occlusion and release of lithium include those materials which contain as a constituent element a metallic or semimetallic element capable of forming an alloy with lithium. Specific examples of such material include elementary substances, alloys and compounds of metallic elements capable of forming an alloy with lithium, as well as elementary substance, alloys and compounds of semimetallic elements capable of forming an alloy with lithium, and materials having a phase of one or more of these elementary substances, alloys and compounds at least at part thereof.

Examples of such metallic or semimetallic elements include tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf), among which preferred are the metallic or semimetallic elements of Group 14 in the long-period periodic table, and particularly preferred are silicon (Si) and tin (Sn). Silicon (Si) and tin (Sn) have a high capability of occlusion and release of lithium and, hence, promise a high energy density.

Examples of alloys of silicon (Si) include those alloys which contain at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Ab) and chromium (Cr), as a second constituent element other than silicon (Si). Examples of alloys of tin (Sn) include those alloys containing at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Ab) and chromium (Cr), as a second constituent element other than tin (Sn).

Examples of the compounds of silicon (Si) or tin (Sn) include those compounds which contain oxygen (O) or carbon (C), and the compounds may contain one or more of the above-mentioned second constituent elements in addition to silicon (Si) or tin (Sn).

[Separator]

The separator 15 may be formed by use of any material that is electrically stable, that is chemically stable in relation to the positive electrode active material, the negative electrode active material and solvent, and that is not electrically conductive. Examples of the material which can be used here include polymer nonwoven fabrics, porous films, and paper-like sheets of glass or ceramic fibers, which may be used in the form of a multi-layer laminate. Particularly preferred are porous polyolefin films, which may be used in the form of a composite with a heat-resistant material formed from polyimide, glass or ceramic fibers or the like.

[Electrolyte]

The electrolyte 16 includes an electrolytic solution and a retainer operable to retain the electrolytic solution, the retainer including a polymeric compound, and is in a so-called gelled state. The electrolytic solution contains an electrolytic salt and a solvent operable to dissolve the electrolytic salt. Examples of the electrolytic salt include lithium salts such as $LiPF_6$, $LiClO_4$, $LiBF_4$, $LiN(SO_2CF_3)_2$, $LiN(SO_2C_2F_5)_2$, and $LiAsF_6$, which may be used either singly or in mixture of two or more of them.

Examples of the solvent include nonaqueous solvents such as lactone solvents such as γ-butyrolactone, γ-valerolactone, δ-valerolactone, ε-caprolactone, etc., carbonic acid ester solvents such as ethylene carbonate, propylene carbonate, butylene carbonate, vinylene carbonate, dimethyl carbonate, ethyl methyl carbonate, diethyl carbonate, etc., ether solvents such as 1,2-dimethoxyethane, 1-ethoxy-2-methoxyethane, 1,2-diethoxyethane, tetrahydrofuran, 2-methyltetrahydrofuran, etc., nitrile solvents such as acetonitrile, etc., nonaqueous solvents such as sulfolane solvents, phosphoric acids, phosphoric acid ester solvents, and pyrrolidones. These solvents may be used either singly or in mixture of two or more of them.

Besides, the solvent preferably contains a compound having a structure in which hydrogen atoms of a cyclic ester or linear ester are partly or entirely fluorinated (replaced by fluorine atoms). Preferred as the fluorinated compound is difluoroethylene carbonate (4,5-difluoro-1,3-dioxolane-2-one). As a result of this, charge-discharge cycle characteristics can be enhanced even in the case where the negative electrode 14 including a compound of silicon (Si), tin (Sn), germanium (Ge) or the like as a negative electrode active material is used. Particularly, difluoroethylene carbonate has an excellent improving effect on the cycle characteristics.

The polymeric compound may be any high molecular compound that is gelled through absorption of the solvent. Examples of the polymeric compound include fluoro polymeric compounds such as polyvinylidene fluoride, a vinylidene fluoride-hexafluoropropylene copolymer, etc., ether polymeric compounds such as polyethylene oxide, a polyethylene oxide-containing crosslinked polymer, etc., and polymeric compounds containing polyacrylonitrile, polypropylene oxide or polymethyl methacrylate as a repeating unit. These polymeric compounds may be used either singly or in mixture of two or more of them.

Particularly, from the viewpoint of oxidation-reduction stability, the fluoro polymeric compounds are desirable, among which the copolymers containing vinylidene fluoride and hexafluoropropylene as components are preferable. Further, the copolymers may contain a monoester of an unsaturated dibasic acid such as monomethyl maleate, etc., an ethylene halide such as ethylene trifluoride, etc., a cyclic carbonic acid ester of an unsaturated compound such as vinylene carbonate, or an epoxy group-containing acrylvinyl monomer or the like as a component, whereby it is made possible to obtain higher characteristics.

Furthermore, as a solid electrolyte, both inorganic solid electrolytes and polymeric solid electrolytes can be used insofar as the solid electrolytes have lithium-ionic conductivity. Examples of the inorganic solid electrolytes include lithium nitride and lithium iodide. The polymeric solid electrolytes each include an electrolytic salt and a polymeric compound operable to dissolve the electrolytic salt. Examples of the polymeric compound include ether polymers such as poly(ethylene oxide), its crosslinked product, etc., poly(methacrylate)ester polymers, acrylate polymers, and so on, which may be used singly, or as copolymers of two or more of them, or in mixture of two or more of them.

[Method of Producing Positive Electrode]

First, the composite oxide particles containing the metallic element M1 in the present invention are synthesized. The means for synthesis of the composite oxide particles is not particularly limited. Further, as a method for allowing the composite oxide particles to react with a compound containing at least one element selected from among sulfur (S), phosphorus (P) and fluorine (F) so as to raise the concentration of the metallic element M2 at the particle surfaces, various methods which have been known are applicable.

In addition, examples of the method for coating the surfaces of the composite oxide particles include a method in which a lithium-transition metal composite oxide containing the metallic element M2 and the compound containing at least one element selected from among sulfur (S), phosphorus (P) and fluorine (F) are put into comminution, mixing and coating (deposition) by use of a ball mill, a chaser mill, a pulverizer or the like. In carrying out this operation, it is effective to add an amount of a liquid component, which can be exemplified by water. Besides, coating (deposition) by a mechano-chemical treatment or coating with (deposition of) a metallic compound by a vapor phase method such as sputtering, CVD (Chemical Vapor Deposition), etc. may also be adopted.

Further, surfaces containing at least one element selected from among sulfur (S), phosphorus (P) and fluorine (F) can be formed on the lithium-transition metal composite oxide particles by mixing the raw materials in water or in such a solvent as ethanol, by crystallization through neutralization in a liquid phase, or by other similar method. After at least one element selected from among sulfur (S), phosphorus (P) and fluorine (F) is thus made to be present on the lithium-transition metal composite oxide containing the metallic element M2, a heat treatment is preferably carried out so as to raise the concentration of the metallic element M2 at the particle surfaces. The heat treatment may be carried out, for example, at a temperature of 350 to 900° C. The lithium-transition metal composite oxide obtained may be one that has been treated by a known technology for control of powder properties.

Subsequently, the positive electrode active material, the binder, and the conduction adjuvant such as a carbon material are mixed together to prepare a positive electrode composition. The positive electrode composition is dispersed in a solvent such as N-methyl-2-pyrrolidone, to prepare a positive electrode composition slurry. The binder may be polyvinylidene fluoride, polytetrafluoroethylene or the like.

Next, the positive electrode composition slurry is applied to the positive electrode current collector 13A, and is dried. Thereafter, compression molding is carried out using a roll pressing machine or the like so as to form the positive electrode active material layer 13B, thereby obtaining the positive electrode 13. Incidentally, the conductivity adjuvant such as a carbon material is mixed, as required, at the time of preparing the positive electrode composition.

Method of Producing Negative Electrode

Next, the negative electrode 14 is produced in the following manner. First, the negative electrode active material and the binder are mixed with each other to prepare a negative electrode composition, and the negative electrode composition is dispersed in a solvent such as N-methyl-2-pyrrolidone to prepare a negative electrode composition slurry. Subsequently, the negative electrode composition slurry is applied to the negative electrode current collector 14A, and the solvent is evaporated off. Thereafter, compression molding is carried out using a roll pressing machine or the like so as to form the negative electrode active material layer 14B, thereby obtaining the negative electrode 14.

Method of Manufacturing Nonaqueous Electrolyte Cell

The nonaqueous electrolyte cell can be manufactured, for example, in the following manner. First, a precursor solution containing the electrolytic solution, the polymeric compound and a mixed solvent is applied to each of the positive electrode 13 and the negative electrode 14, and the mixed solvent is evaporated off, to form the electrode 16. Thereafter, the positive electrode lead 11 is attached to an end portion of the positive electrode current collector 13A by welding, and the negative electrode lead 12 is attached to an end portion of the negative electrode current collector 14A by welding.

Next, the positive electrode 13 and the negative electrode 14 with the electrolyte 16 formed thereon are stacked together with the separator 15 therebetween to form a stacked body, the stacked body is wound in the longitudinal direction, and the protective tape 17 is adhered to an outermost peripheral portion of the wound body, to form a wound electrode body 10. Finally, for example, the wound electrode body 10 is sandwiched between the casing members 1, and outer edge portions of the casing members 1 are adhered to each other by heat fusing or the like, to seal the wounded electrode body 10 inside the casing members 1. In this case, the adhesion film 2 is inserted between each of the positive electrode lead 11 and the negative electrode lead 12 and each of the casing members 1. In this way, the nonaqueous electrolyte cell as shown in FIGS. 1 and 2 is completed.

Besides, the nonaqueous electrolyte cell may also be manufactured in the following manner. First, the positive electrode 13 and the negative electrode 14 are produced in the above-mentioned manner, and the positive electrode lead 11 and the negative electrode lead 12 are attached to the positive electrode 13 and the negative electrode 14, respectively. Then, the positive electrode 13 and the negative electrode 14 are stacked together with the separator 15 therebetween to form a stacked body, the stacked body is wound, and the protective tape 17 is adhered to an outermost peripheral portion of the wound body, to form a wound body as a precursor of the wound electrode body 10. Next, the wound body is sandwiched between the casing members 1, outer peripheral edge portions exclusive of one lateral edge of the casing members 1 are heat fused to obtain a bag-like shape, whereby the wound body is accommodated inside the casing member 1. Subsequently, an electrolyte composition containing the electrolytic solution, a monomer or monomers as raw material for the polymeric compound, a polymerization initiator and, if necessary, other material(s) such as a polymerization inhibitor is prepared, and the electrolyte composition is introduced into the inside of the casing member 1.

After the introduction of the electrolyte composition, the opening portion of the casing member 1 is sealed by heat fusing in a vacuum atmosphere. Next, heat is applied to bring the monomer or monomers into polymerization to form the polymeric compound, whereby the gelled electrolyte 16 is formed and the nonaqueous electrolyte cell as shown in FIGS. 1 and 2 is assembled.

The details of the improvement of cycle characteristics and the like have not yet been elucidated, but the improvement is supposed to be attained by the following mechanism. Inside the lithium ion secondary cell in the charged state, the positive electrode is in a strongly oxidizing state, and the electrolytic solution in contact with the positive electrode is in such an environment that oxidative dissociation thereof is liable to proceed, particularly in high-temperature environments. When the dissociation of the electrolytic solution proceeds, an inactive coating film is formed on the particles of the positive electrode active material, thereby impeding the migration of electrons and/or lithium ions.

Further, the dissociated components produce very active molecules in the electrolytic solution present in pores in the electrode, to accelerate the deterioration of the electrolytic solution or to attack the positive electrode active material, thereby dissolving the component elements of the material or reducing the capacity. In order to restrain such a phenomenon, stabilization of the interface between the positive electrode active material particles and the electrolytic solution is insufficient, and both this stabilization and stabilization of active molecules outside of and in the vicinity of the positive electrode active material particles have to be achieved in a cooperative manner.

In the lithium-containing transition metal oxide in the embodiments, the metallic element M2 different from the principal transition metal inside the oxide particles are made present at the particle surfaces, so as to stabilize the interface between the positive electrode active material and the electrolytic solution. In addition, the lithium-transition metal composite oxide containing at least one element selected from among sulfur (S), phosphorus (P) and fluorine (F) in an aggregated form is made present in the vicinity of the particles, so as to stabilize the active molecules. It is considered that, owing to a synergistic effect of these stabilizations, the cell performance is enhanced in a very high extent.

Further, it is considered that since the metallic element M2 is preliminarily made to be uniformly present inside the particles and then the concentration of the metallic element M2 at the particle surfaces is raised to ensure that the metallic element M is uniformly present at the particle surfaces, the stabilizing effect of the metallic element M can be displayed to the utmost, resulting in the successful enhancement of cell performance.

Effect

According to the nonaqueous electrolyte cell in the first embodiment, it is possible to suppress deterioration of cycle characteristics, to suppress a rise in internal resistance due to charge-discharge cycles in high-temperature environments, and thereby to simultaneously realize both an enhanced capacity and improved cell characteristics.

2. Second Embodiment

Second Example of Nonaqueous Electrolyte Cell

A second embodiment will be described. A nonaqueous electrolyte cell according to the second embodiment uses positive active material with more uniformly coating.

Since other materials and configurations are the same as in the first embodiment, the explanations about these are omitted.

Positive Electrode Active Material

The positive electrode active material is, for example, composite oxide particles which contain therein a metallic element M2 different from a principal transition metal M1 and which have a concentration gradient of the metallic element M2 from the center toward the surface of each particle. The concentration gradient is such that the concentration of the metallic element M2 increases as the particle surface is approached. The composite oxide particles are particles of a lithium-containing transition metal composite oxide wherein at least one element X selected from among sulfur (S), phosphorus (P) and fluorine (F) is present in an aggregated form at the surfaces of the composite oxide particles.

In the second embodiment, the compound containing at least one element selected from among sulfur (S), phosphorus (P) and fluorine (F) or the pyrolyzed product of the compound, has a melting point of 70° C. or more and of 600° C. or less. The compound or the pyrolyzed product of the compound, being positioned on the surface of the composite oxide by certain means such as using a ball mill, is melted by heating, to uniformly coat the surface of the composite oxide. Following these, the heated and melted compound or pyrolyzed product of the compound is made to react with the composite oxide. The coatings are more effectively and uniformly made than those of the first embodiment.

When the compound or pyrolyzed product of the compound is heated at the temperature of more than 600° C., the reaction in the composite oxide will be brought about and the structure of the composite oxide can be changed. But in this embodiment, the compound or the pyrolyzed product of the compound melts and coats the composite oxide to react with the composite oxide to be in stable status, before the change of the structure of the composite oxide.

If the melting point of the compound or pyrolyzed product is more than 600° C., the coating reaction begins before the compound or the product melts and coat the surface of the composite oxide and reaction between the compound or the product and the composite oxide starts, which renders partial coating reactions only at the site where the compound or the product and the composite oxide are in contact, which leads to the unfavorable nonuniform coating on the composite oxide.

Heating at the temperature of more than 600° C. also leads to a change in the structure of the composite oxide.

If the melting point of the compound or pyrolyzed product is less than 70° C., the component or the product will unfavorably melt or decompose during deposition by ball milling or the like.

The compound or the pyrolyzed product of the compound has preferably the average diameter of 30 μm or less. The compound or the pyrolyzed product of such diameter will realize the uniform coatings of the composite oxide. When the diameter of the compound or the pyrolyzed product is too large, they cannot be well mixed with the composite oxide, which brings about the nonuniform deposition on the composite oxide with a ball mill or the like. The diameter of the compound or the pyrolyzed product has no lower limitat. A smaller diameter will enable more uniform coatings. But the diameter is practically limited by the communition of the compound or the pyrolyzed product into about 1 μm.

Examples of the compound are ammonium phosphate dibasic (($NH_4$)$_2$$HPO_4$), ammonium dihydrogen phosphate ($NH_4H_2PO_4$), ammonium sulfate (($NH_4$)$_2$$HPO_4$), phosphoric acid ($H_3PO_4$), and so on. Cations of these are eliminated by for example, vaporization when heated and, therefore, the positive electrode active materials without impurities can be obtained, which can avoid decrease of the capacity and other adverse effects.

As a metallic element M2 different from the principal transition metal M1, the same metallic element M2 as in the embodiment 1 can be adopted.

Method of Producing Positive Electrode Active Material

Positive electrode active material of the second embodiment can be prepared, for example, according to the following procedures.

First, the surfaces of the composite oxide particles are coated with coating materials. As for the example method for coating the surfaces of the composite oxide particles, a method the same as in the first embodiment can be adopted, in which a lithium-transition metal composite oxide containing the metallic element M1 and the compound containing at least one element X selected from among sulfur (S), phosphorus (P) and fluorine (F) are put into comminution, mixing and coating (deposition) by use of a ball mill, a chaser mill, a pulverizer or the like.

In carrying out this operation, it is effective to add an amount of a liquid component, which can be exemplified by water. Besides, coating (deposition) by a mechano-chemical treatment or coating with (deposition of) a metallic compound by a vapor phase method such as sputtering, CVD (Chemical Vapor Deposition), etc. may also be adopted.

After at least one element X selected from among sulfur (S), phosphorus (P) and fluorine (F) is thus made to be present on the lithium-transition metal composite oxide containing the metallic element M1, a heat treatment is preferably carried out so as to raise the concentration of the metallic element M2 at the particle surfaces. The heat treatment may be carried out, for example, at a temperature of 700 to 900° C. The lithium-transition metal composite oxide obtained may be put through the treatment of a known technology for control of powder properties or some other purposes.

During the heat treatment, the compound positioned on the surface of the composite oxide is melted to be in a liquid state and the surface of the composite oxide gets uniformly covered with the compound. After a further heat treatment, the compound is decomposed and cations are eliminated, and anions react with metallic element M2 included in composite oxide. The temperature of the heat treatment can be raised after the compound is melted to react the compound with coating material.

Effect

According to the second embodiment, the composite oxide can be coated with coating materials before the structure of the composite oxide changes. Therefore the function of the cathode active material is improved, which leads to better properties of nonaqueous electrolyte secondary battery.

3. Third Embodiment

Third Example of Nonaqueous Electrolyte Cell

A second embodiment will be described. A nonaqueous electrolyte cell according to the second embodiment uses an electrolytic solution in place of the gelled electrolyte 16 in the nonaqueous electrolyte cell according to the first embodiment. In this case, the electrolytic solution is used by impregnating the separator 15 therewith. As the electrolytic solution, the same electrolytic solutions as those in the first embodiment above can be used.

The nonaqueous electrolyte cell thus configured can be manufactured, for example, in the following manner. First, the positive electrode 13 and the negative electrode 14 are produced. The positive electrode 13 and the negative electrode 14 can be produced in the same manner as in the above-described first embodiment, and, therefore, detailed description of the production is omitted here.

Next, after the positive electrode lead 11 and the negative electrode lead 12 are attached respectively to the positive electrode 13 and the negative electrode 14, the positive electrode 13 and the negative electrode 14 are stacked together with the separator 15 therebetween to form a stacked body, the laminate is wound, and the protective tape 17 is adhered to an outermost peripheral portion of the wound body.

As a result, a wound electrode body is obtained which is the same in configuration as the above-described wound electrode body 10, except that the electrolyte 16 is omitted. After the wound body is sandwiched between the casing members 1, the electrolytic solution is introduced into the inside of the casing members 1, and the casing members 1 are sealed off. In this manner, the nonaqueous electrolyte cell according to the second embodiment is obtained.

Effect

According to the third embodiment, the effects equivalent to those in the first embodiment above can be obtained. Specifically, it is possible to suppress deterioration of cycle characteristics, to suppress a rise in internal resistance due to charge-discharge cycles in high-temperature environments, and thereby to simultaneously realize both an enhanced capacity and improved cell characteristics.

4. Fourth Embodiment

Fourth Example of Nonaqueous Electrolyte Cell

Figure 3:
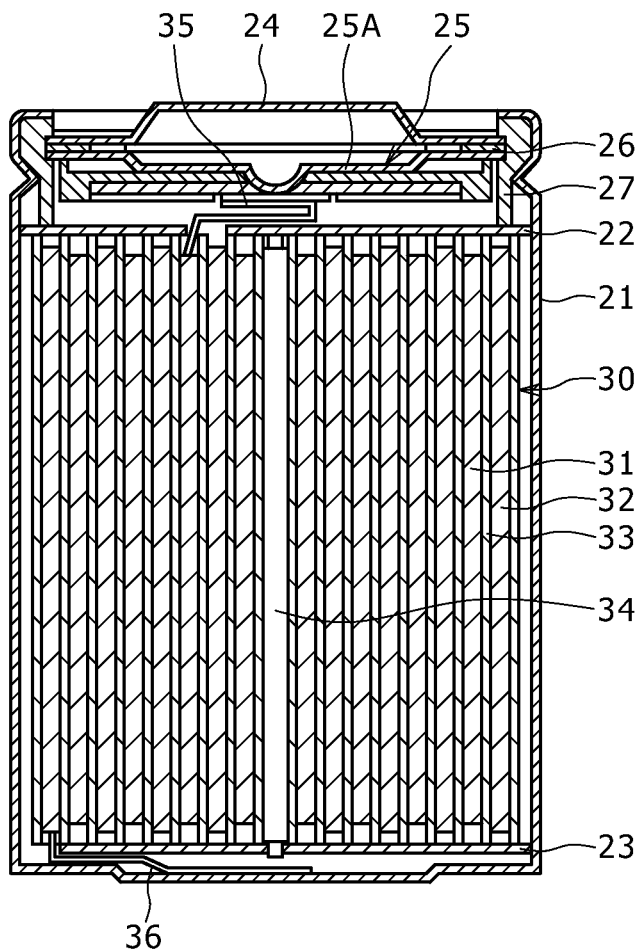
FIG. 3 is a sectional view showing a configuration example of a nonaqueous electrolyte cell according to an embodiment.

Now, the configuration of a nonaqueous electrolyte cell according to a fourth embodiment will be described below referring to FIGS. 3 and 4. FIG. 3 shows the configuration of the nonaqueous electrolyte cell according to the fourth embodiment.

This nonaqueous electrolyte cell is a so-called cylindrical type cell, wherein a wound electrode body 30 formed by winding a band-shaped positive electrode 31 and a band-shaped negative electrode 32 with a separator 33 therebetween is disposed inside a substantially hollow cylindrical cell can 21.

The separator 33 is impregnated with an electrolytic solution, which is a liquid electrolyte. The cell can 21 is formed, for example, from iron (Fe) plated with nickel (Ni). The cell can 21 is closed at one end thereof, and is open at the other end thereof. Inside the cell can 21, a pair of insulating plates 22 and 23 are disposed perpendicularly to the circumferential surface of the wound electrode body 30, respectively on opposite sides of the wound electrode body 30.

At the open end of the cell can 21, a cell cap 24 as well as a safety valve mechanism 25 and a PTC (Positive Temperature Coefficient) thermistor element 26 which are provided inside the cell cap 24 is mounted by caulking, through using a gasket 27. By this, the inside of the cell can 21 is sealed off.

The cell cap 24 is formed, for example, from the same material as that of the cell can 21. The safety vale mechanism 25 is electrically connected with the cell cap 24 through the thermistor element 26. The safety valve mechanism 25 is so configured that when the internal pressure of the cell reaches or exceeds a predetermined value due to internal short-circuit or external heating, a disc plate 25A is inverted to cut off the electrical connection between the cell cap 24 and the wound electrode body 30.

The thermistor element 26 limits a current by an increase in its resistance when temperature is raised, so as to prevent abnormal heat generation from occurring due to a large current. The gasket 27 is formed, for example, from an insulating material, and its surface is coated with asphalt.

The wound electrode body 30 is, for example, wound about a center pin 34. A positive electrode lead 35 formed from aluminum (Al) or the like is connected to the positive electrode 31 in the wound electrode body 30, while a negative electrode lead 36 formed from nickel (Ni) or the like is connected to the negative electrode 32. The positive electrode lead 35 is electrically connected to the cell cap 24 by being welded to the safety valve mechanism 25, while the negative electrode lead 36 is electrically connected to the cell can 21 by welding to the latter.

Figure 4:
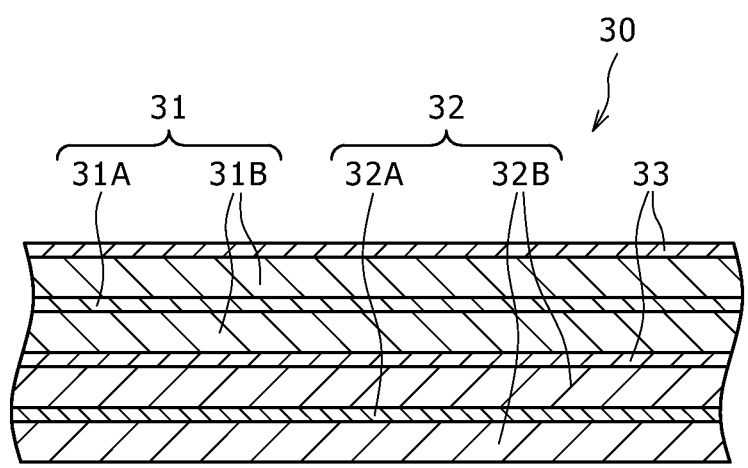
FIG. 4 is a sectional view showing, in an enlarged form, a part of a wound electrode body shown in FIG. 3.
Figure 5:
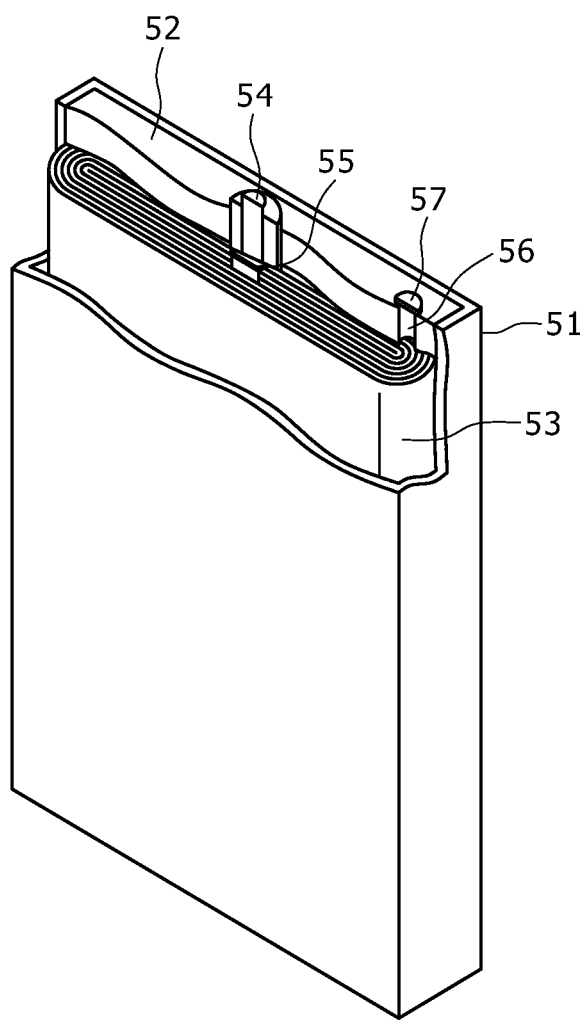
FIG. 5 is a sectional view showing a configuration example of a nonaqueous electrolyte cell according to an embodiment.

FIG. 4 is a sectional view showing, in an enlarged form, a part of the wound electrode body 30 shown in FIG. 3. The wound electrode body 30 has a structure in which the positive electrode 31 and the negative electrode 32 are stacked together with the separator 33 therebetween to form a stacked body, and the stacked body is wound.

The positive electrode 31, for example, includes a positive electrode current collector 31A and positive electrode active material layers 31B provided respectively on both sides of the positive electrode current collector 31A. The negative electrode 32, for example, includes a negative electrode current collector 32A and negative electrode active material layers 32B provided respectively on both sides of the negative electrode current collector 32A. The configurations of the positive electrode current collector 31A, the positive electrode active material layers 31B, the negative electrode current collector 32A, the negative electrode active material layers 32B, the separator 33 and the electrolytic solution are equivalent respectively to those of the positive electrode current collector 13A, the positive electrode active material layers 13B, the negative electrode current collector 14A, the negative electrode active material layers 14B, the separator 15 and the electrolytic solution in the first embodiment described above.

Method of Manufacturing Nonaqueous Electrolyte Cell

Now, the method of manufacturing the nonaqueous electrolyte cell according to the fourth embodiment will be described below. The positive electrode 31 is produced as follows. First, a positive electrode active material and a binder are mixed with each other to prepare a positive electrode composition, which is dispersed in a solvent such as N-methyl-2-pyrrolidone to prepare a positive electrode composition slurry. Next, the positive electrode composition slurry is applied to the positive electrode current collector 31A, and is dried. Thereafter, compression molding is carried out using a roll pressing machine or the like to form the positive electrode active material layers 31B, thereby obtaining the positive electrode 31.

The negative electrode 32 is produced in the following manner. First, a negative electrode active material and a binder are mixed with each other to prepare a negative electrode composition, which is dispersed in a solvent such as N-methyl-2-pyrrolidone to prepare a negative electrode composition slurry. Next, the negative electrode composition slurry is applied to the negative electrode current collector 32A, and the solvent is evaporated off. Thereafter, compression molding is conducted using a roll pressing machine or the like to form the negative electrode active material layers 32B, thereby obtaining the negative electrode 32.

Subsequently, a positive electrode lead 35 is attached to the positive electrode current collector 31A by welding or the like, and a negative electrode lead 36 is attached to the negative electrode current collector 32A by welding or the like. Thereafter, a stack of the positive electrode 31 and the negative electrode 32 with the separator 33 therebetween is wound, a tip portion of the positive electrode lead 35 is welded to the safety valve mechanism 25, and a tip portion of the negative electrode lead 36 is welded to the cell can 21.

Then, the stack of the positive electrode 31 and the negative electrode 32 is clamped between the pair of insulating plates 22 and 23, and are accommodated in the cell can 21. After the positive electrode 31 and the negative electrode 32 are accommodated in the cell can 21, the electrolyte is introduced into the inside of the cell can 21 so that the separator 33 is impregnated with the electrolyte.

Thereafter, the cell cap 24, the safety valve mechanism 25 and the thermistor element 26 are fixed to the open end portion of the cell can 21 by caulking, through using the gasket 27. In this manner, the nonaqueous electrolyte cell shown in FIG. 3 is manufactured.

Effect

In the nonaqueous electrolyte cell according to the fourth embodiment, it is possible to suppress generation of gas and to prevent breakage of the cell due to a rise in internal pressure.

5. Fifth Embodiment

Fifth Example of Nonaqueous Electrolyte Cell

A nonaqueous electrolyte cell according to a fifth embodiment uses a positive electrode active material with more uniform coating in place of the positive electrode active material in the nonaqueous electrolyte cell of the fourth embodiment.

Since other materials and configurations are the same as in the fourth embodiment, the explanations about these are omitted.

Positive Electrode Active Material

The molar faction r(%) Of the positive electrode active material of the fifth embodiment satisfies the formula $0.20 \leq r \leq 0.80$ in the range where the ratio d(%) from the surface to a certain depth satisfies $0.020 \leq d \leq 0.050$. Ratio d and molar fraction r are determined according to the following formula.

Ratio $d(\%)$=[(mass of the principal transition metal $M1$)+(mass of metallic element $M2$)]/(mass of whole particles)    (I)

Molar fraction $r$=(mass of metallic element $M2$)/ [(mass of principal transition metal $M1$)+(mass of metallic element M2)]    (II)

Except the above-mentioned point, the positive electrode active material of the fifth embodiment is same as that of the fourth embodiment.

The mass of a principal transition metal Ma and the mass of the metallic element M2 can be known by dissolving the surface of the lithium-transition metal composite oxide into a buffering solvent to analyze the mass of the content of a principal transition metal Ma and metallic element M2 dissolved in the buffering solvent.

Specifically ratio d(%) and molar fraction rate r can be determined as follows. First, add buffering solvent is added to lithium-transition metal composite oxide particle and they are mixed. Then, the buffering solvent is sampled every certain term and the solvent is filtered. The mass of the principal transition metal M1 and mass of the metallic element M2 contained in each of the buffering solvent are measured by Inductively Coupled Plasma method.

Then the amounts [mol] of metal M1 and metallic element M2 are calculated from the masses, and obtain ratio d and molar fraction r are obtained according to the formula (I) and (II). Here, the particle is presumed to be spherical and calculation is made under the presumption that the particles dissolved into the buffering solvent get smaller in diameter in a state of maintaining spherical form.

The above mentioned analysis of the surface of the positive electrode active material is three dimensional and enables quantitative analysis of the concentration gradient, which are quite difficult to realize by the conventional analysis method of the surface status of positive electrode active material.

On condition that molar fraction ratio r(%) falls within the range of $0.20 \leq r \leq 0.80$ where the ratio d(%) from the surface to a certain depth satisfies $0.020 \leq d \leq 0.050$, capacity retention and high-temperature preservability capacity are high.

Whereas even if molar fraction ratio r(%) falls in the range of $0.20 \leq r \leq 0.80$ where the ratio d(%) from the surface to a certain depth does not satisfy $0.020 \leq d \leq 0.050$, there is a tendency of the effect of improvement in capacity retention and high-temperature storage preservability not always being shown.

It is preferable that the molar ratio r(%) decreases from the surface to the inside within the range where the ratio from the surface to a certain depth d(%) satisfies $0.020 \leq d \leq 0.050$, because lowering of capacity retention rate and high-temperature preservability are avoidable, especially, lowering of capacity retention is remarkably avoidable.

In addition to that the molar fraction ratio r(%) falls within the range of $0.20 \leq r \leq 0.80$ where the ratio d(%) from the surface to a certain depth satisfies $0.020 \leq d \leq 0.050$, it is preferable that molar ratio r satisfies $0.55 \leq r \leq 1.0$ in the range where the ratio from the surface to a certain depth d(%) satisfies $0.010 \leq d \leq 0.020$, because lowering of discharge capacity is avoided and cycle property and high-temperature storage property are improved.

Method of Producing Cell

Method of producing the nonaqueous electrolyte secondary cell of the fifth embodiment is as follows.

First, lithium-transition metal composite oxide particles containing lithium, a principal transition metal M1, and metallic element M2 are mixed with a compound containing at least one element X selected from among sulfur (S), phosphorus (P) and fluorine (F). A compound including lithium is preferably further mixed. Then, deposition of the compound containing at least one element X selected from among sulfur (S), phosphorus (P) and fluorine (F) and preferably the compound including lithium on the surface of the lithium-transition metal composite oxide is effected by mechanochemical treatment. The mixture is under the mechanochemical treatment for 5 minutes or longer and two hours or shorter. Coating is not enough when mechanochemical treatment is done shorter than 5 minutes, while the positive electrode active material particles break into smaller particles with too short diameters.

Next, lithium-transition metal composite oxide particle is fired to get positive electrode active material. The temperature for firing is preferably 500 to 1500° C. If the temperature is under 500° C., the lithium-transition metal particles are not coated enough. While, if the temperature is higher than 1500° C., particles aggregate to make secondary particles, which leads to worsening of coating properties on collectors.

After firing, lithium-transition metal composite oxide particles have a concentration gradient of the metallic element M2 from the center toward the surface of each particle. The particles contains at least one element X selected from among sulfur (S), phosphorus (P) and fluorine (F) deposited on surfaces of the composite oxide particles in the form of aggregate.

Generally molar ratio r can be adjusted by adapting addition amount of the compound containing at least one element X selected from among sulfur (S), phosphorus (P) and fluorine (F). When the compound is added too little, reaction is too small to obtain enough coating and molar ratio r is lowered. When addition amount is large, molar ratio r gets larger, but r never becomes larger than 1 in principle. The reaction proceeds from the surface to the inside, and therefore when additional amount is large, a high molar fraction ratio is obtained from the parts where the ratio d(%) from the surface to a certain depth is large.

When coating materials, i.e., the compound or the pyrolysed compound and the base materials i.e., the lithium-transition metal composite oxide are not well mixed, the molar fractional ratio r is lowered. For example, diameter of the compound is 100 μm or more, which is larger than the average diameter of positive electrode material 5 to 30 μm, and non-uniformly dispersed. Consequently preferable coating status is not obtained and molar fraction ratio r sometimes gets low. As for technique of mixing, any techniques can be adapted so long as base materials and coating materials are well mixed, such as planetary mixer, primary techniques like shaking mixtures in the bag.

After the positive electrode active material is obtained, the same procedures as described in the fourth embodiment can be taken to obtain nonaqueous electrolyte cell of the fifth embodiment.

The upper limit of charging voltage of the cell of the fourth embodiment can be 4.2 V, but preferably is designed to be higher than 4.2 V. Practically, cell is designed so that the upper limit of charging voltage is preferably 4.25 to 4.80 V, more preferably 4.35 V or higher from the viewpoint of discharge capacity, 4.65 V or lower from the viewpoint of safety. The lower limit of discharging voltage of the cell is preferably 2.00 to 3.30 V. To design cell voltage high brings about a high energy density.

6. Other Embodiment

Modification

The present invention is not limited to the above-described embodiments of the invention, and various modifications and applications are possible within the scope of the invention. For instance, the shape of the nonaqueous electrolyte cell is not limited to the above-mentioned type (cylindrical type), and may be of a coin type, for example.

In addition, for example, a polymeric solid electrolyte included an ionically conductive polymeric material or an inorganic solid electrolyte included an ionically conductive inorganic material may be used as the electrolyte. Examples of the ionically conductive polymeric material include polyethers, polyesters, polyphosphazenes, and polysiloxanes. Examples of the inorganic solid electrolyte include ionically conductive ceramics, ionically conductive crystals, and ionically conductive glasses.

The positive electrode active material of the fifth embodiment can be adopted in the cell of the first to third embodiment.

EXAMPLES

Now, the present invention will be described specifically below by showing examples, which are not to be construed as limitative of the invention.

In the examples 1-1 to 1-13 and comparative examples 1-1 to 1-9, additional volume of coating materials was varied and cell properties with positive materials different in distribution of coating materials at the surface of composite oxide were determined.

Example 1-1

Production of Positive Electrode

After lithium carbonate ($Li_2CO_3$), cobalt oxide ($Co_3O_4$), aluminum hydroxide ($Al(OH)_3$), and magnesium carbonate ($MgCO_3$) were mixed at a molar ratio of Li:Co:Al:Mg=1.00:0.98:0.01:0.01, the mixture was fired at 900° C. in air for 5 hr, to obtain a lithium-cobalt composite oxide ($LiCo_{0.98}Al_{0.01}Mg_{0.01}O_2$). The average particle diameter of the lithium-cobalt composite oxide was measured by a laser scattering method, to be 13 μm.

Subsequently, lithium carbonate ($Li_2CO_3$) and diammonium hydrogenphosphate (($NH_4)_2HPO_4$) were weight and mixed with the lithium-cobalt composite oxide ($LiCO_{0.98}Al_{0.01}Mg_{0.01}O_2$) so as to obtain an atomic ratio of Co:Li:P=98:1:1. Then, the mixed material containing the lithium-cobalt composite oxide was treated by a mechanochemical system for 1 hr. As a result, there was obtained a precursor before firing in which particles of the lithium-cobalt composite oxide were present as a central material, and lithium carbonate and diammonium hydrogenphosphate were deposited on the particle surfaces.

The precursor before firing was subjected to a temperature rise at a rate of 3° C./min, and was held at 900° C. for 3 hr, followed by slow cooling, to obtain a lithium-transition metal composite oxide pertaining to the present invention. The lithium-transition metal composite oxide had magnesium (Mg) uniformly distributed at the surfaces of the lithium-cobalt composite oxide particles. Besides, the concentration of magnesium (Mg) was higher at the particle surfaces than in the inside of the particles, and lithium phosphate ($Li_3PO_4$) was interspersed on the particle surfaces.

Incidentally, the surface state of the lithium-transition metal composite oxide was confirmed by observation of the obtained powder under SEM/EDX. Upon the observation of the surfaces of the lithium-transition metal composite oxide, uniform distribution of magnesium (Mg) on the particle surfaces and interspersing of phosphorus on the particle surfaces were confirmed. In addition, magnesium concentration was confirmed by cutting a section of the lithium-transition metal composite oxide, and measuring the element distribution in the radial direction by Auger electron spectroscopy. Upon the measurement of the element distribution in the section of the lithium-transition metal composite oxide, the magnesium concentration was confirmed to be varying continuously from the surface toward the inside of the particle.

In addition, when the powder was subjected to measurement of powder X-ray diffraction pattern by use of CuKα, a diffraction peak corresponding to $Li_3PO_4$ was confirmed in addition to a diffraction peak corresponding to $LiCoO_2$ having a laminar rock salt structure.

By using as a positive electrode active material the lithium-transition metal composite oxide obtained as above, a nonaqueous electrolyte secondary cell was manufactured, and the cell was evaluated with respect to high-temperature cycle characteristics and internal resistance variation, as described below.

A positive electrode composition was prepared by mixing 98 wt % of the above-mentioned positive electrode active material, 1.5 wt % of an amorphous carbon powder (Ketchen black) and 3 wt % of polyvinylidene fluoride (PVdF). The positive electrode composition was dispersed in N-methyl-2-pyrrolidone (NMP) to prepare a positive electrode composition slurry, which was then uniformly applied to both sides of a positive electrode current collector composed of a band-shaped aluminum foil. Subsequently, the positive electrode composition slurry on the surfaces of the positive electrode current collector was dried in a stream of warm air, and compression molding was carried out using a roll pressing machine, to form positive electrode composition layer.

Production of Negative Electrode

A negative electrode composition was prepared by mixing 95 wt % of a graphite powder with 5 wt % of PVdF. The negative electrode composition was dispersed in N-methyl-2-pyrrolidone to prepare a negative electrode composition slurry, which was then uniformly applied to both sides of a negative electrode current collector composed of a band-like copper foil, followed by press molding under heating, to form negative electrode composition layers.

Preparation of Electrolytic Solution

In a mixed solvent obtained by mixing ethylene carbonate (EC) and methyl ethyl carbonate (MEC) in a volume ratio of 1:1, lithium hexafluorophosphate ($LiPF_6$) as dissolved so as to attain a concentration of 1 mol/dm³, to prepare a nonaqueous electrolytic solution.

Assembly of Cell

The band-shaped positive and negative electrodes produced as above were wound a number of times in the state of being stacked together, with a separator composed of a porous polyolefin therebetween, to produce a spiral type wound electrode body. The wound electrode body was accommodated in a cell can made of nickel-plated iron, and insulating plates were disposed on upper and lower faces of the wound electrode body. Next, a nickel-made negative electrode terminal connected with a negative electrode current collector was welded to a bottom portion of the cell can. In addition, an aluminum-made positive electrode terminal connected with a positive electrode current collector was welded to a protruding portion of a safety valve securely put in electrical conduction to a cell cap.

Finally, the nonaqueous electrolytic solution was introduced into the cell can in which the wound electrode body had been incorporated. Thereafter, the cell can was caulked through using an insulating seal gasket, to immobilize the safety valve, a PTC thermistor element and the cell cap. In this manner, there was manufactured a cylindrical type cell having an outside diameter of 18 mm and a height of 65 mm.

Evaluation of Cell (a) Initial Capacity

The cylindrical type cell manufactured as above was subjected to constant-current charging at a charging current of 1.5 A up to a charging voltage of 4.35 V in an environment of an ambient temperature of 45° C. Then, the constant-current charging was switched over to constant-voltage charging, and the charging was finished when the total charging time reached 2.5 hr. Immediately thereafter, the cell was subjected to discharging at a discharging current of 2.0 A, and the discharging was finished when the cell voltage was lowered to 3.0 V. The discharge capacity in this instance was measured as an initial capacity, which was found to be 9.1 Wh.

(b) Capacity Retention

The cell was subjected to repeated charge-discharge cycles in the same charge-discharge conditions as in the above-mentioned case for measuring the initial capacity. Upon the 300th cycle, the discharge capacity was measured, and capacity retention based on the initial capacity was determined. The capacity retention was 82%.

Example 1-2

A nonaqueous electrolyte secondary cell was manufactured in the same manner as in Example 1-1, except that the cell voltage upon charging was 4.20 V. Upon evaluation of the cell, the initial capacity was found to be 8.0 Wh, and the capacity retention was 82%. Incidentally, the concentration distributions of elements in the positive electrode active material and the surface states of particles of the active material in Example 1-2 and the latter Examples and Comparative Examples are shown in Table 1 below.

Example 1-3

A nonaqueous electrolyte secondary cell was manufactured in the same manner as in Example 1-1, except that the cell voltage upon charging was 4.4 V. Upon evaluation of the cell, the initial capacity was found to be 9.4 Wh, and the capacity retention was 80%.

Example 1-4

A nonaqueous electrolyte secondary cell was manufactured in the same manner as in Example 1-1, except that the cell voltage upon charging was 4.5 V. Upon evaluation of the cell, the initial capacity was found to be 10.0 Wh, and the capacity retention was 61%.

Example 1-5

A nonaqueous electrolyte secondary cell was manufactured in the same manner as in Example 1-1, except that the coating material to be deposited on lithium-cobalt composite oxide ($LiCo_{0.98}Al_{0.01}Mg_{0.01}O_2$) was ammonium dihydrogenphosphate ($NH_4H_2PO_4$). Upon evaluation of the cell, the initial capacity was found to be 9.1 Wh, and the capacity retention was 80%.

Example 1-6

A nonaqueous electrolyte secondary cell was manufactured in the same manner as in Example 1-1, except that the coating material to be deposited on lithium-cobalt composite oxide ($LiCo_{0.98}Al_{0.01}Mg_{0.01}O_2$) was lithium hexafluorophosphate ($LiPF_6$) and the firing temperature was 700° C. Upon evaluation of the cell, the initial capacity was found to be 9.1 Wh, and the capacity retention was 81%.

Example 1-7

A nonaqueous electrolyte secondary cell was manufactured in the same manner as in Example 1-1, except that the coating material to be deposited on lithium-cobalt composite oxide ($LiCo_{0.98}Al_{0.01}Mg_{0.01}O_2$) was lithium tetrafluoroborate ($LiBF_4$) and the firing temperature was 700° C. Upon evaluation of the cell, the initial capacity was found to be 9.1 Wh, and the capacity retention was 76%.

Example 1-8

A nonaqueous electrolyte secondary cell was manufactured in the same manner as in Example 1-1, except that the coating material to be deposited on lithium-cobalt composite oxide ($LiCo_{0.98}Al_{0.01}Mg_{0.01}O_2$) was sulfur (S), and the firing temperature of 700° C. Upon evaluation of the cell, the initial capacity was found to be 9.1 Wh, and the capacity retention was 64%.

Example 1-9

A nonaqueous electrolyte secondary cell was manufactured in the same manner as in Example 1-1, except that lithium-cobalt composite oxide ($LiCo_{0.98}Al_{0.01}Mg_{0.01}O_2$), lithium carbonate ($Li_2CO_3$) and diammonium hydrogenphosphate (($NH_4)_2HPO_4$) were mixed in an atomic ratio of Co:Li:P=98:0.5:0.5. Upon evaluation of the cell, the initial capacity was found to be 9.1 Wh, and the capacity retention was 80%.

Example 1-10

A nonaqueous electrolyte secondary cell was manufactured in the same manner as in Example 1-1, except that lithium-cobalt composite oxide ($LiCo_{0.98}Al_{0.01}Mg_{0.01}O_2$), lithium carbonate ($Li_2CO_3$) and diammonium hydrogenphosphate (($NH_4)_2HPO_4$) were mixed in an atomic ratio of Co:Li:P=98:2.5:2.5. Upon evaluation of the cell, the initial capacity was found to be 8.9 Wh, and the capacity retention was 75%.

Example 1-11

A nonaqueous electrolyte secondary cell was manufactured in the same manner as in Example 1-1, except that lithium-cobalt composite oxide ($LiCo_{0.98}Al_{0.01}Mg_{0.01}O_2$), lithium carbonate ($Li_2CO_3$) and diammonium hydrogenphosphate (($NH_4)_2HPO_4$) were mixed in an atomic ratio of Co:Li:P=98:5:5. Upon evaluation of the cell, the initial capacity was found to be 8.2 Wh, and the capacity retention was 69%.

Example 1-12

A nonaqueous electrolyte secondary cell was manufactured in the same manner as in Example 1-1, except that the composition of lithium-cobalt composite oxide was $LiCo_{0.97}Al_{0.01}Mg_{0.02}O_2$. Upon evaluation of the cell, the initial capacity was found to be 9.0 Wh, and the capacity retention was 84%.

Example 1-13

A nonaqueous electrolyte secondary cell was manufactured in the same manner as in Example 1-1, except that the composition of lithium-cobalt composite oxide was $LiCo_{0.95}Al_{0.01}Mg_{0.04}O_2$. Upon evaluation of the cell, the initial capacity was found to be 8.8 Wh, and the capacity retention was 82%.

Comparative Example 1-1

A nonaqueous electrolyte secondary cell was manufactured in the same manner as in Example 1-1, except that the coating treatment of lithium-cobalt composite oxide ($LiCo_{0.98}Al_{0.01}Mg_{0.01}O_2$) was omitted. Upon evaluation of the cell, the initial capacity was found to be 9.2 Wh, and the capacity retention was 31%.

Comparative Example 1-2

A nonaqueous electrolyte secondary cell was manufactured in the same manner as in Example 1-1, except that the coating treatment of lithium-cobalt composite oxide ($LiCo_{0.98}Al_{0.01}Mg_{0.01}O_2$) was omitted and that the cell voltage upon charging was 4.2 V. Upon evaluation of the cell, the initial capacity was found to be 8.1 Wh, and the capacity retention was 71%.

Comparative Example 1-3

A nonaqueous electrolyte secondary cell was manufactured in the same manner as in Example 1-1, except that the coating treatment of lithium-cobalt composite oxide ($LiCo_{0.98}Al_{0.01}Mg_{0.01}O_2$) was omitted and that the cell voltage upon charging was 4.4 V. Upon evaluation of the cell, the initial capacity was found to be 9.5 Wh, and the capacity retention was 25%.

Comparative Example 1-4

A nonaqueous electrolyte secondary cell was manufactured in the same manner as in Example 1-1, except that the composition of lithium-cobalt composite oxide was $LiCoO_2$, that the coating material to be deposited on lithium-cobalt composite oxide ($LiCoO_2$) was a mixture of lithium carbonate ($Li_2CO_3$), magnesium carbonate ($MgCO_3$) and diammonium hydrogenphosphate (($NH_4)_2HPO_4$), and that lithium-cobalt composite oxide ($LiCoO_2$), lithium carbonate ($Li_2CO_3$), magnesium carbonate ($MgCO_3$) and diammonium hydrogenphosphate (($NH_4)_2HPO_4$) were so weighed and mixed as to obtain an atomic ratio of Co:Li:Mg:P=100:1:1:1. Upon evaluation of the cell, the initial capacity was found to be 9.1 Wh, and the capacity retention was 32%.

Comparative Example 1-5

A nonaqueous electrolyte secondary cell was manufactured in the same manner as in Example 1-1, except that the composition of lithium-cobalt composite oxide was $LiCoO_2$, that the coating material to be deposited on lithium-cobalt composite oxide ($LiCoO_2$) was aluminum fluoride ($AlF_3$), and that lithium-cobalt composite oxide ($LiCoO_2$) and aluminum fluoride ($AlF_3$) were so weighed and mixed as to obtain an atomic ratio of Co:Al=100:1. Upon evaluation of the cell, the initial capacity was found to be 9.1 Wh, and the capacity retention was 30%.

Comparative Example 1-6

A nonaqueous electrolyte secondary cell was manufactured in the same manner as in Example 1-1, except that the composition of lithium-cobalt composite oxide was $LiCoO_2$, that the coating material to be deposited on lithium-cobalt composite oxide ($LiCoO_2$) was aluminum phosphate ($AlPO_4$), and that lithium-cobalt composite oxide ($LiCoO_2$) and aluminum phosphate ($AlPO_4$) were so weighed and mixed as to obtain an atomic ratio of Co:Al=100:1. Upon evaluation of the cell, the initial capacity was found to be 9.1 Wh, and the capacity retention was 25%.

Comparative Example 1-7

A nonaqueous electrolyte secondary cell was manufactured in the same manner as in Example 1-1, except that the composition of lithium-cobalt composite oxide was $LiCoO_2$. Upon evaluation of the cell, the initial capacity was found to be 9.1 Wh, and the capacity retention was 20%.

Comparative Example 1-8

A nonaqueous electrolyte secondary cell was manufactured in the same manner as in Example 1-1, except that the composition of lithium-cobalt composite oxide was $LiCoO_2$, that the coating material to be deposited on lithium-cobalt composite oxide ($LiCoO_2$) was lithium phosphate ($Li_3PO_4$), and that lithium-cobalt composite oxide ($LiCoO_2$) and lithium phosphate ($Li_3PO_4$) were so weighed and mixed as to obtain an atomic ratio of Co:P=100:1. Upon evaluation of the cell, the initial capacity was found to be 9.1 Wh, and the capacity retention was 15%.

Comparative Example 1-9

A nonaqueous electrolyte secondary cell was manufactured in the same manner as in Example 1-1, except that the firing temperature during the firing after the treatment for coating with diammonium hydrogenphosphate (($NH_4)_2HPO_4$) was 300° C. Upon evaluation of the cell, the initial capacity was found to be 8.6 Wh, and the capacity retention was 35%.

The evaluation results are shown in Table 1 below.

TABLE 1

| | Composite oxide particle | Coating material | Addition amounts | Distr. States | | | Firing temp. [° C.] | Voltage [V] | Initial capacity [Wh] | Capacity retention [%] |
| | | | | Mg | Mg conc. gradient | Surface | | | | |
|---|---|---|---|---|---|---|---|---|---|---|
| Example 1-1 | $LiCo_{0.98}Al_{0.01}Mg_{0.01}O_2$ | $Li_2CO_3$ | Co:Li:P = 98:1:1 | u. | pr. | P, int. | 900 | 4.35 | 9.1 | 82 |
| Example 1-2 | | $(NH_4)_2HPO$ | Co:Li:P = 98:1:1 | u. | pr. | P, int. | 900 | 4.2 | 8.0 | 85 |
| Example 1-3 | | | Co:Li:P = 98:1:1 | u. | pr. | P, int. | 900 | 4.4 | 9.4 | 80 |
| Example 1-4 | | | Co:Li:P = 98:1:1 | u. | pr. | P, int. | 900 | 4.5 | 10.0 | 61 |
| Example 1-5 | | $(NH_4)_2HPO_4$ | Co:P = 98:1 | u. | pr. | P, int. | 900 | 4.35 | 9.1 | 80 |
| Example 1-6 | | $LiPF_6$ | Co:Li:P = 98:1:1 | u. | pr. | P, F, int. | 700 | 4.35 | 9.1 | 81 |
| Example 1-7 | | $LiBF_4$ | Co:Li:P = 98:1:1 | u. | pr. | F, int. | 700 | 4.35 | 9.1 | 76 |
| Example 1-8 | | S | Co:S = 98:1 | u. | pr. | S, int. | 700 | 4.35 | 9.1 | 64 |
| Example 1-9 | | $Li_2CO_3$ | Co:Li:P = 98:0.5:0.5 | u. | pr. | P, int. | 900 | 4.35 | 9.1 | 80 |
| Example 1-10 | | $(NH_4)_2HPO_4$ | Co:Li:P = 98:0.5:0.5 | u. | pr. | P, int. | 900 | 4.35 | 8.9 | 75 |
| Example 1-11 | | | Co:Li:P = 98:5:5 | u. | pr. | P, int. | 900 | 4.35 | 8.2 | 69 |
| Example 1-12 | $LiCo_{0.96}Al_{0.01}Mg_{0.02}O_2$ | | Co:Li:P = 97:1:1 | u. | pr. | P, int. | 900 | 4.35 | 9.0 | 84 |
| Example 1-13 | $LiCo_{0.94}Al_{0.01}Mg_{0.04}O_2$ | | Co:Li:P = 95:1:1 | u. | pr. | P, int. | 900 | 4.35 | 8.8 | 82 |
| Comp. Ex. 1-1 | $LiCo_{0.98}Al_{0.01}Mg_{0.01}O_2$ | — | — | u. | ab. | — | 900 | 4.35 | 9.2 | 31 |
| Comp. Ex. 1-2 | $LiCo_{0.98}Al_{0.01}Mg_{0.01}O_2$ | — | — | u. | ab. | — | 900 | 4.2 | 8.1 | 71 |
| Comp. Ex. 1-3 | $LiCo_{0.98}Al_{0.01}Mg_{0.01}O_2$ | — | — | u. | ab. | — | 900 | 4.4 | 9.5 | 25 |
| Comp. Ex. 1-4 | $LiCoO_2$ | $Li_2CO_3$ $MgCO_3$ $(NH_4)_2HPO_4$ | Co:Li:Mg:P = 100:1:1:1 | nu. | pr. | P, int. | 900 | 4.35 | 9.1 | 32 |
| Comp. Ex. 1-5 | $LiCoO_2$ | $AlF_3$ | Co:Al = 100:1 | nu. | pr. | F, int. | 900 | 4.35 | 9.1 | 30 |
| Comp. Ex. 1-6 | $LiCoO_2$ | $AlPO_4$ | Co:Al = 100:1 | nu. | pr. | P, int. | 900 | 4.35 | 9.1 | 25 |
| Comp. Ex. 1-7 | $LiCoO_2$ | $Li_2CO_3$ $(NH_4)_2HPO_4$ | Co:Li:P = 100:1:1 | — | — | P, int. | 900 | 4.35 | 9.1 | 20 |

TABLE 1-continued

| | Composite oxide particle | Coating material | Addition amounts | Distr. States Mg | Mg conc. gradient | Surface | Firing temp. [° C.] | Voltage [V] | Initial capacity [Wh] | Capacity retention [%] |
|---|---|---|---|---|---|---|---|---|---|---|
| Comp. Ex. 1-8 | $LiCoO_2$ | $Li_3PO_4$ | Co:Li:P = 100:3:1 | — | — | P, int. | 900 | 4.35 | 9.1 | 15 |
| Comp. Ex. 1-9 | $LiCo_{0.98}Al_{0.01}Mg_{0.01}O_2$ | $Li_2CO_3$ $(NH_4)_2HPO_4$ | Co:Li:P = 98:1:1 | u. | pr. | P, u. | 300 | 4.35 | 8.6 | 35 |

Notes:-
u.: uniform,
nu.: nonuniform,
pr.: present,
ab.: absent,
int.: interspersed As is seen from the evaluation results, a capacity retention as well as a good initial capacity could be realized in Examples in which use was made of a positive electrode active material such that magnesium (Mg) was distributed uniformly, with a concentration gradient from the inside toward the surface of the composite oxide particle, and that the particle surfaces are coated in such a manner as to have sulfur (S), phosphorus (P) or the like in an interspersed state.

On the other hand, in Comparative Examples 1-1 to 1-3 in which the coating material was absent, the capacity retention was lowered, more conspicuously as the charging voltage of the cell was higher. Besides, in Comparative Examples 1-4 to 1-6 inside which the distribution of magnesium (Mg) inside the oxide particles was nonuniform, a high capacity retention could not be maintained, even if a concentration gradient was present. Further, in the cases where the above-mentioned metallic element M2 was absent, the capacity retention was very low, even if sulfur (S), phosphorus (P) or the like was present interspersed on the surfaces of the oxide particles.

In Examples form 2-1 to 2-9, coating material was varied and cell properties with positive materials different in coating materials at the surface of composite oxide are obtained.

Example 2-1

The same nonaqeuous electrolyte secondary cell as in Example 1-1 except Ammonium phosphate dibasic (($NH_4)_2HPO_4$) with average diameter measured by laser scattering method of 10 μm and with melting point of 190° C. is deposited on lithium-cobalt composite oxide ($LiCO_{0.98}Al_{0.01}Mg_{0.01}O_2$) instead of lithium carbonate and diammonium hydrogenphosphate is prepared and evaluated in the same manner as in example 1-1 with charging voltage of 4.35. The initial capacity was 9.1 Wh and capacity retention was 85%.

Example 2-2

The same nonaqeuous electrolyte secondary cell as in Example 2-1 except Ammonium sulphate (($NH_4)_2HSO_4$) with average diameter measured by laser scattering method of 10 μm and with melting point of 513° C. is deposited on lithium-cobalt composite oxide ($LiCO_{0.98}Al_{0.01}Mg_{0.01}O_2$) is prepared. The initial capacity was 9.1 Wh and capacity retention was 87%.

Example 2-3

The same nonaqeuous electrolyte secondary cell as in Example 2-1 except Ammonium phosphate dibasic (($NH_4)_2HPO_4$) with average diameter measured by laser scattering method of 30 μm and with melting point of 190° C. is deposited on lithium-cobalt composite oxide ($LiCO_{0.98}Al_{0.01}Mg_{0.01}O_2$) is prepared. The initial capacity was 9.1 Wh and capacity retention was 80%.

Example 2-4

The same nonaqeuous electrolyte secondary cell as in Example 2-1 is prepared except Lithium cobalt composite oxide ($LiNi_{0.79}Co_{0.19}Al_{0.01}Mg_{0.01}O_2$) is coated. The initial capacity was 10.9 Wh and capacity retention was 81%.

Example 2-5

The same nonaqeuous electrolyte secondary cell as in Example 2-1 is prepared except Lithium cobalt composite oxide ($LiNi_{0.49}CO_{0.19}Mn_{0.29}Al_{0.01}Mg_{0.01}O_2$) is coated. The initial capacity was 9.5 Wh and capacity retention was 80%.

Example 2-6

The same nonaqeuous electrolyte secondary cell as in Example 2-1 except phosphatic acid ($H_3PO_4$) with average diameter measured by laser scattering method of 10 μm and with melting point of 43° C. is deposited on lithium-cobalt composite oxide ($LiCO_{0.98}Al_{0.01}Mg_{0.01}O_2$) is prepared. The initial capacity was 9.1 Wh and capacity retention was 53%.

Example 2-7

The same nonaqeuous electrolyte secondary cell as in Example 2-1 except iron sulfate (Fe2(SO4)3) with average diameter measured by laser scattering method of 10 μm and with melting point of 480° C. is deposited on lithium-cobalt composite oxide ($LiCO_{0.98}Al_{0.01}Mg_{0.01}O_2$) is prepared. The initial capacity was 8.9 Wh and capacity retention rate was 80%.

Example 2-8

The same nonaqeuous electrolyte secondary cell as in Example 2-1 except ammonium phosphate dibasic (($NH_4)_2HPO_4$) with average diameter measured by laser scattering method of 100 μm and with melting point of 190° C. is deposited on lithium-cobalt composite oxide ($LiCO_{0.98}Al_{0.01}Mg_{0.01}O_2$) is prepared. The initial capacity was 9.1 Wh and capacity retention was 58%.

Example 2-9

The same nonaqeuous electrolyte secondary cell as in Example 2-1 except ammonium phosphate dibasic $((NH_4)_2HPO_4)$ with average diameter measured by laser scattering method of 100 μm and with melting point of 837° C. is deposited on lithium-cobalt composite oxide $(LiCO_{0.98}Al_{0.01}Mg_{0.01}O_2)$ is prepared. The initial capacity was 9.0 Wh and capacity retention was 60%.

The evaluation results are shown in Table 2 below. In Table 2, result of Comparative Example 1-1 is also shown for reference.

TABLE 2

| | | Coating material | | | | | | | |
|---|---|---|---|---|---|---|---|---|---|
| | Composite oxide particle | Material | Average particle diameter [μM] | Melting point [° C.] | Addition amounts | Firing temp. [° C.] | Voltage [V] | Initial capacity [Wh] | Capacity retention [%] |
| Example 2-1 | $LiCo_{0.98}Al_{0.01}Mg_{0.01}O_2$ | $(NH_4)_2HPO_4$ | 10 | 190 | Co:P = 99:1 | 900 | 4.35 | 9.1 | 85 |
| Example 2-2 | | $(NH_4)_2HPO_4$ | 10 | 513 | Co:S = 99:1 | | | 9.1 | 87 |
| Example 2-3 | | $(NH_4)_2HPO_4$ | 30 | 190 | Co:P = 99:1 | | | 9.1 | 80 |
| Example 2-4 | $LiNi_{0.79}Co_{0.19}Al_{0.01}Mg_{0.01}O_2$ | $(NH_4)_2HPO_4$ | 10 | 190 | Ni + Co:P = 99:1 | | | 10.9 | 81 |
| Example 2-5 | $LiNi_{0.49}Co_{0.19}MN_{0.29}Al_{0.01}Mg_{0.02}O_2$ | $(NH_4)_2HPO_4$ | 10 | 190 | Ni + Co + Mn:P = 99:1 | | | 9.5 | 80 |
| Example 2-6 | $LiC_{0.98}Al_{0.01}Mg_{0.01}O_2$ | $H_3PO_4$ | 10 | 43 | Co:P = 99:1 | | | 9.1 | 53 |
| Example 2-7 | | $Fe_2(SO_4)$ | 10 | 480 | Co:S = 99:1 | | | 8.9 | 80 |
| Example 2-8 | | $(NH_4)_2HPO_4$ | 100 | 190 | Co:P = 99:1 | | | 9.1 | 58 |
| Example 2-9 | | $(NH_4)_2HPO_4$ | 10 | 837 | Co:P = 99:1 | | | 9.0 | 60 |
| Comp. Ex. 1-1 | $LiCo_{0.98}Al_{0.01}Mg_{0.01}O_2$ | — | — | — | — | 900 | 4.35 | 9.2 | 31 |

As is seen from the evaluation results, a capacity retention could be realized in Examples 2-1 to 2-5, in which the compound or the pyrolized compound containing phosphorus P or fluorine F has the melting point of 80 to 600° C.

It can be presumed that the compound or the pyrolized compound containing phosphorus P or fluorine becomes liquid when fired at 900° C. and coating uniformly the surface of the composite oxide. In these Examples, initial capacities are maintained high because ammonium is evaporated and not remaining in the active materials.

In Examples 2-4 and 2-5, when using Lithium-nickel-cobalt composite oxide or Lithium-nickel-cobalt-manganese composite oxide is used as a central material of the positive electrode active material, positive electrode active material with a concentration gradient such that the concentration of the metallic element M2 increases from the center toward the surface of the composite oxide particle with good capacity retention is obtained.

As for Example 2-6, capacity retention is improved but improvement owing to the coating was not much. It is because phosphoric acid was dissolved during mechanochemical treatment and coating was not as effective as those in Examples 2-1 to 2-5. This is caused because the melting point of phosphoric acid is lower than the temperature of mechanochemical treatment.

As for Example 2-7, coating was preferable since the melting point of the compound falls within the range from 70 to 600° C. but decomposed material remained on the surface of the positive electrode and initial discharging capacity was slightly decreased because of this impurity which does not contribute to charge or discharge reaction.

In Example 2-8, coating material was not well mixed with composite oxide because of too large a diameter of coating material. Therefore volume retention was improved but improvement owing to the coating was not much. It is because the melting point of coating material was 837° C., being higher than 600° C. and near to the firing temperature, which leads to the regional reaction of coating material with composite oxide before coating material melts and preferably coats the composite oxide, and disturbs preferable coating.

In Examples 3-1 to 3-14 and Comparative Examples 3-1 to 3 to 14, ratio d and molar fraction ratio r were varied and cell properties were determined.

In these Examples, ratio d and molar fraction ratio r were obtained as follows.

[Ratio d and Molar Fraction Ratio r]

Buffering solvent prepared to pH5.1 with citric acid and sodium citrate was added to 0.2 g of lithium-transition metal composite oxide. Mixture was stirred up and sample was filtered with 0.2 μm filter every minutes. Mass or volume concentration of the principal transition metal M1, i.e., Co and mass or volume concentration of the metallic element M2 i.e., Mg, Mn, Ni contained in each of the sample was measured by ICP-AES: Inductively Coupled Plasma Atomic Emission Spectrometry method [HORIBA JY238 ULTRACE] to obtain mass of M1 and M2 dissolved in 10 ml of buffer solvent. With the result, amounts [mol] of M1 and M2 were calculated. Ratio d and molar fraction ratio r were determined according to the formula (I) and (II).

ratio $d(\%)$=[(mass of the principal transition metal $M1$+(mass of metallic element $M2$)]/(mass of whole particles)    (I)

molar fraction $r$=(mass of metallic element $M2$)/ [(mass of principal transition metal $M1$+(mass of metallic element $M2$)]    (II)

The coating including M2 therein is most effective state for capacity retention and high temperature preservability where ratio d satisfies $0.20 \leq r \leq 0.80$, i.e., 10 to 100 nm depth from the surface. In following Examples, molar fraction ratio r was varied with ratio d in the range of $0.20 \leq r \leq 0.80$ and cell properties of each cell were examined.

In the following Examples, distribution states of metallic element M2 and element X were determined as follows.

[Distribution States of Metallic Element M2 and Element X]

By SEM/EDX Mg is examined to confirm whether Mg on the surface of the particle is uniformly distributed or not and P is interspersed on the surface or not. Particle was cut and element distribution along diameter was measured by Auger Electron Spectroscopy to observe the continuous variance of Mg in consistency.

Example 3-1

Positive electrode active material was prepared as follows.
The Precursor for firing in the same manner as in Example 1-1 was subjected to a temperature rise at a rate of 3° C./min, and was held at 900° C. for 3 hr, followed by slow cooling, to obtain a lithium-transition metal composite oxide. The lithium-transition metal composite oxide had magnesium (Mg) uniformly distributed at the surfaces of the lithium-cobalt composite oxide particles. Besides, the concentration of magnesium (Mg) was higher at the particle surfaces than in the inside of the particles, and lithium phosphate (Li3PO4) was interspersed on the particle surfaces.

Incidentally, the surface concentration gradient of Magnesium Mg was confirmed in detail. Molar fraction ratios r at ratio d=0.02%, 0.05% were 0.32, 0.30 respectively. Molar fraction ratios r at ratio d=0.01%, 0.10% were 0.46, 0.25 respectively.

The surface state of the lithium-transition metal composite oxide was confirmed by observation of the obtained powder under SEM/EDX. Upon the observation of the surfaces of the lithium-transition metal composite oxide, uniform distribution of magnesium (Mg) on the particle surfaces and interspersing of phosphorus on the particle surfaces were confirmed. The particle was subjected to measurement of powder X-ray diffraction pattern by use of CuKα, a diffraction peak corresponding to $Li_3PO_4$ was confirmed in addition to a diffraction peak corresponding to $LiCoO_2$ having a laminar rock salt structure. In addition, magnesium concentration was confirmed by cutting a section of the lithium-transition metal composite oxide, and measuring the element distribution in the radial direction by Auger electron spectroscopy. Upon the measurement of the element distribution in the section of the lithium-transition metal composite oxide, the magnesium concentration was confirmed to be varying continuously from the surface toward the inside of the particle.

By using as a positive electrode active material the lithium-transition metal composite oxide obtained as above, a nonaqueous electrolyte secondary cell was manufactured according to the same method as in Example 1-1.

The cell was subjected to evaluations of initial capacity, capacity retention and high-temperature storage property. The high-temperature storage property was determined as follows.

The cell manufactured as above was subjected to charging at a charging current of 1.5 A up to a charging voltage of 4.35 V in an environment of an ambient temperature of 45° C. Immediately thereafter, the cell was subjected to discharging at a discharging current of 2.0 A, and the discharging was finished when the cell voltage was lowered to 3.0 V. Then the cell was subjected to high-temperature storage by being left in an environment of an ambient temperature of 60° C. for 300 hr. After that, the discharge capacity after high-temperature storage was measured by discharging at 0.2° C. With initial capacity and discharge capacity after high-temperature storage, the high temperature capacity retention rate, i.e., high-temperature storage preservability was obtained according to the following formula. High temperature capacity retention rate [%]=(discharge capacity after high-temperature storage/initial capacity)×100

Example 3-2

Nonaqueous electrolyte secondary cell was prepared in the same manner as in Example 3-1, and subjected to evaluation of initial capacity, capacity retention and high-temperature storage retention property in the same manner as in Example 3-1 except that charging voltage was 4.2 V.

Example 3-3

Nonaqueous electrolyte secondary cell was prepared in the same manner as in Example 3-1, and subjected to evaluation of initial capacity, capacity retention and high-temperature storage retention property in the same manner as in Example 3-1 except that charging voltage was 4.5 V.

Example 3-4

Positive electrode active material was prepared in the same manner as in Example 3-1 except that the temperature of second firing was set to 950° C. and the time of the second firing was 30 minutes. Molar fraction ratios r at ratio d=0.02%, 0.05% were 0.22, 0.21 respectively. Molar fraction ratios r at ratio d=0.01%, 0.10% were 0.38, 0.16 respectively. Nonaqueous electrolyte secondary cell was prepared in the same manner as in Example 3-1 and was subjected to evaluation of initial capacity, capacity retention and high-temperature storage retention property in the same manner as in Example 3-1 except that charging voltage was 4.5 V.

Example 3-5

Positive electrode active material was prepared in the same manner as in Example 3-1 except that composite oxide as base material was LiCo0.95Al0.01Mg0.04O2. Molar fraction ratios r at ratio d=0.02%, 0.05% were 0.73, 0.52 respectively. Molar fraction ratios r at ratio d=0.01%, 0.10% were 0.86, 0.44 respectively. Nonaqueous electrolyte secondary cell was prepared in the same manner as in Example 3-1 and was subjected to evaluation of initial capacity, capacity retention and high-temperature storage retention property in the same manner as in Example 3-1.

Example 3-6

Positive electrode active material was prepared in the same manner as in Example 3-1 except that composite oxide as base material was LiCo0.97Al0.01Mg0.02O2. Molar fraction ratios r at ratio d=0.02%, 0.05% were 0.31, 0.31 respectively. Molar fraction ratios r at ratio d=0.01%, 0.10% were 0.56, 0.25 respectively. Nonaqueous electrolyte secondary cell was prepared in the same manner as in Example 3-1 and was subjected to evaluation of initial capacity, capacity retention and high-temperature storage retention property in the same manner as in Example 3-1.

Example 3-7

Positive electrode active material was prepared in the same manner as in Example 3-1 except that composite oxide as base material was $LiCoO_3$ and mixed with Lithium carbonate $Li_2CO_3$, Magnesium carbonate $MgCO_3$, Ammonium phosphate dibasic $NH_4H_2PO_4$ in ratios shown in table 3 and 4. Molar fraction ratios r at ratio d=0.02%, 0.05% were 0.46, 0.40 respectively. Molar fraction ratios r at ratio d=0.01%, 0.10% were 0.55, 0.44 respectively. Nonaqueous electrolyte secondary cell was prepared in the same manner as in Example 3-1 and was subjected to evaluation of initial capacity, capacity retention and high-temperature storage retention property in the same manner as in Example 3-1.

Example 3-8

Positive electrode active material was prepared in the same manner as in Example 3-1 except that LiCoO2 was used as Lithium Cobalt composite oxide for base material and was coated with coating material of nickel hydroxide and manganese phosphate. On coating, materials were prepared and mixed so that molar fraction ratios r (Ni+Mn/Ni+Mn+Co) at ratio d=0.02%, 0.05% were 0.35, 0.34 respectively and molar fraction ratios r at ratio d=0.01%, 0.10% were 0.56, 0.25 respectively. Nonaqueous electrolyte secondary cell was prepared in the same manner as in Example 3-1 and was subjected to evaluation of initial capacity, capacity retention and high-temperature preservability in the same manner as in Example 3-1.

Comparative Example 3-1

Composite oxide $LiCO_{0.98}Al_{0.01}Mg_{0.01}O_2$ without coating was used as positive electrode active material. Molar fraction ratios r at ratio d=0.02%, 0.05% were 0.01, 0.01 respectively. Molar fraction ratios r at ratio d=0.01%, 0.10% were 0.01, 0.01 respectively. Nonaqueous electrolyte secondary cell was prepared in the same manner as in Example 3-1 and was subjected to evaluations of initial capacity, capacity retention and high-temperature preservability in the same manner as in Example 3-1.

Comparative Example 3-2

Positive electrode active material was prepared in the same manner as in Example 3-1 except that LiCoO2 was used for Lithium Cobalt composite oxide as a base material and mixed with Lithium carbonate LiCoO3, Magnesium carbonate MgCo3, and ammonium phosphate dibasic $NH_4H_2PO_4$ in a molar ratio of Co:Li:Mg:P=100:1:0.5:1. Molar fraction ratios r at ratio d=0.02%, 0.05% were 0.18, 0.10 respectively. Molar fraction ratios r at ratio d=0.01%, 0.10% were 0.25, 0.08 respectively. Nonaqueous electrolyte secondary cell was prepared in the same manner as in Example 3-1 and subjected to evaluation of initial capacity, capacity retention and high-temperature preservability in the same manner as in Example 3-1.

Comparative Example 3-3

Positive electrode active material was prepared in the same manner as in Example 3-1 except that Lithium Cobalt composite oxide $LiCO_{0.98}Al_{0.01}Mg_{0.01}O_2$, Lithium carbonate LiCoO3, Magnesium carbonate MgCo3, and ammonium phosphate dibasic $NH_4H_2PO_4$ were mixed in a molar ratio of Co:Li:Mg:P=100:1:1:4. Molar fraction ratios r at ratio d=0.02%, 0.05% were 0.82, 0.83 respectively. Molar fraction ratios r at ratio d=0.01%, 0.10% were 0.80, 0.85 respectively. Nonaqueous electrolyte secondary cell was prepared in the same manner as in Example 3-1 and subjected to evaluation of initial capacity, capacity retention and high-temperature preservability in the same manner as in Example 3-1.

Comparative Example 3-4

Positive electrode active material was prepared in the same manner as in Example 3-1 except that the temperature of second firing was set to 950° C. and the time of the second firing as 30 minutes. Molar fraction ratios r at ratio d=0.02%, 0.05% were 0.22, 0.21 respectively. Molar fraction ratios r at ratio d=0.01%, 0.10% were 0.38, 0.16 respectively. Nonaqueous electrolyte secondary cell was prepared in the same manner as in Example 3-1 and subjected to evaluation of initial capacity, capacity retention and high-temperature preservability in the same manner as in Example 3-1.

Comparative Example 3-5

Positive electrode active material was prepared in the same manner as in Example 3-1 except that except that $LiCo0.95Al0.01Mg0.04O2$ was used for Lithium Cobalt composite oxide as a base material Molar fraction ratios r at ratio d=0.02%, 0.05% were 0.73, 0.52 respectively. Molar fraction ratios r at ratio d=0.01%, 0.10% were 0.86, 0.44 respectively. Nonaqueous electrolyte secondary cell was prepared in the same manner as in Example 3-1 and subjected to evaluation of initial capacity, capacity retention and high-temperature preservability in the same manner as in Example 3-1.

Comparative Example 3-6

A nonaqueous electrolyte secondary cell was manufactured in the same manner as in Comparative Example 3-5. The sell was subjected to evaluation of initial capacity, capacity retention and high-temperature preservability in the same manner as in Example 3-1 except that the cell voltage upon charging was 4.2 V.

Comparative Example 3-7

A nonaqueous electrolyte secondary cell was manufactured in the same manner as in Comparative Example 3-5. The sell was subjected to evaluation of initial capacity, capacity retention and high-temperature preservability in the same manner as in Example 3-1 except that the cell voltage upon charging was 4.5 V.

Comparative Example 3-8

Positive electrode active material was prepared in the same manner as in Example 3-1 except that second firing procedure was omitted. Molar fraction ratios r at ratio d=0.02%, 0.05% were 0.80, 0.81 respectively. Molar fraction ratios r at ratio d=0.01%, 0.10% were 0.82, 0.79 respectively. Nonaqueous electrolyte secondary cell was prepared in the same manner as in Example 3-1 and subjected to evaluation of initial capacity, capacity retention and high-temperature preservability in the same manner as in Example 3-1.

Comparative Example 3-9

Positive electrode active material was prepared in the same manner as in Example 3-1 except that mechano-chemical treatment was done for 15 minutes. Molar fraction ratios r at ratio d=0.02%, 0.05% were 0.21, 0.16 respectively. Molar fraction ratios r at ratio d=0.01%, 0.10% were 0.31, 0.14 respectively. Nonaqueous electrolyte secondary cell was prepared in the same as in Example 3-1 and subjected to evaluation of initial capacity, capacity retention and high-temperature preservability in the same way as in Example 3-1.

Comparative Example 3-10

Positive electrode active material was prepared in the same manner as in Example 3-1 except that LiCoO2 was used as Lithium Cobalt composite oxide for a base material and was coated with coating material of nickel hydroxide and manganese phosphate. On coating, materials were prepared and mixed so that molar ratio of Ni:Co:Mn=1:1:1 in the whole positive electrode active material particle and that molar fraction ratios r (Ni+Mn/Ni+Mn+Co) at ratio d=0.02%, 0.05% were 0.25, 0.17 respectively and molar fraction ratios r at ratio d=0.01%, 0.10% were 0.30, 0.15 respectively. Nonaqueous electrolyte secondary cell was prepared in the same manner as in Example 3-1 and subjected to evaluation of initial capacity, capacity retention and high-temperature preservability in the same manner as in Example 3-1.

The structure of the positive electrode active material of the nonaqueous electrolyte secondary cell and evaluation results of Examples 3-1 to 3-8 and Comparative Examples 3-1 to 3-10 are shown in Tables 3 and 4 below.

TABLE 3

| | Base material | Coating material | Addition amounts | Distr. States | | |
|---|---|---|---|---|---|---|
| | | | | Mg | Mg conc. gradient | Surface |
| Example 3-1 | $LiCo_{0.98}Al_{0.01}Mg_{0.01}O_2$ | $Li_2CO_3 + NH_4H_2PO_4$ | Co:Li:P = 98:1:1 | u. | pr. | P, int. |
| Example 3-2 | $LiCo_{0.98}Al_{0.01}Mg_{0.01}O_2$ | $Li_2CO_3 + NH_4H_2PO_4$ | Co:Li:P = 98:1:1 | u. | pr. | P, int. |
| Example 3-3 | $LiCo_{0.98}Al_{0.01}Mg_{0.01}O_2$ | $Li_2CO_3 + NH_4H_2PO_4$ | Co:Li:P = 98:1:1 | u. | pr. | P, int. |
| Example 3-4 | $LiCo_{0.98}Al_{0.01}Mg_{0.01}O_2$ | $Li_2CO_3 + NH_4H_2PO_4$ | Co:Li:P = 98:1:1 | u. | pr. | P, int. |
| Example 3-5 | $LiCo_{0.95}Al_{0.01}Mg_{0.04}O_2$ | $Li_2CO_3 + NH_4H_2PO_4$ | Co:Li:P = 98:1:1 | u. | pr. | P, int. |
| Example 3-6 | $LiCo_{0.98}Al_{0.01}Mg_{0.02}O_2$ | $Li_2CO_3 + NH_4H_2PO_4$ | Co:Li:P = 98:1:1 | u. | pr. | P, int. |
| Example 3-7 | $LiCoO_2$ | $Li_2CO_3 + MgCO_3 + NH_4H_2PO_4$ | Co:Li:Mg:P = 100:1:2:1 | u. | pr. | P, int. |
| Example 3-8 | $LiCoO_2$ | $Ni(OH)_2, MnPO_4$ | Ni:Co:Mn = 5:2:3 | Ni, Mn, u. | pr. | P, int. |
| Comp. Ex. 3-1 | $LiCo_{0.98}Al_{0.01}Mg_{0.01}O_2$ | — | — | u. | ab. | X, ab. |
| Comp. Ex. 3-2 | $LiCoO_2$ | $Li_2CO_3 + MgCO_3, NH_4H_2PO_4$ | Co:Li:Mg:P = 100:1:0.5:1 | nu. | pr. | P, int. |
| Comp. Ex. 3-3 | $LiCo_{0.98}Al_{0.01}Mg_{0.01}O_2$ | $Li_2CO_3 + NH_4H_2PO_4$ | Co:Li:P = 98:1:4 | u. | pr. | P, int. |
| Comp. Ex. 3-4 | $LiCo_{0.98}Al_{0.01}Mg_{0.01}O_2$ | $Li_2CO_3 + NH_4H_2PO_4$ | Co:Li:P = 98:1:1 | u. | pr. | P, int. |
| Comp. Ex. 3-5 | $LiCo_{0.98}Al_{0.01}Mg_{0.01}O_2$ | $Li_2CO_3 + NH_4H_2PO_4$ | Co:Li:P = 98:1:1 | u. | pr. | P, int. |
| Comp. Ex. 3-6 | $LiCo_{0.98}Al_{0.01}Mg_{0.01}O_2$ | $Li_2CO_3 + NH_4H_2PO_4$ | Co:Li:P = 98:1:1 | u. | pr. | P, int. |
| Comp. Ex. 3-7 | $LiCo_{0.98}Al_{0.01}Mg_{0.01}O_2$ | $Li_2CO_3 + NH_4H_2PO_4$ | Co:Li:P = 98:1:1 | u. | pr. | P, int. |
| Comp. Ex. 3-8 | $LiCo_{0.98}Al_{0.01}Mg_{0.01}O_2$ | $Li_2CO_3 + NH_4H_2PO_4$ | Co:Li:P = 98:1:1 | u. | pr. | P, int. |
| Comp. Ex. 3-9 | $LiCo_{0.98}Al_{0.01}Mg_{0.01}O_2$ | $Li_2CO_3 + NH_4H_2PO_4$ | Co:Li:P = 98:1:1 | u. | pr. | P, int. |
| Comp. Ex. 3-10 | $LiCoO_2$ | $Ni(OH)_2, MnPO_4$ | Ni:Co:Mn = 1:1:1 | Ni, Mn, u. | pr. | P, int. |

| | Molar fraction r (d = 0.02%) | Molar fraction r (d = 0.05%) | Voltage [V] | Initial discharge capacity [Wh] | Capacity retention [%] | High-temperature preserveability [%] |
|---|---|---|---|---|---|---|
| Example 3-1 | 0.32 | 0.30 | 4.35 | 9.1 | 82 | 90 |
| Example 3-2 | 0.32 | 0.30 | 4.20 | 8.0 | 85 | 94 |
| Example 3-3 | 0.32 | 0.30 | 4.50 | 10.0 | 68 | 80 |
| Example 3-4 | 0.22 | 0.21 | 4.35 | 9.3 | 81 | 90 |
| Example 3-5 | 0.73 | 0.52 | 4.35 | 8.8 | 87 | 94 |

TABLE 3-continued

|  |  |  |  |  |  |  |
|---|---|---|---|---|---|---|
| Example 3-6 | 0.31 | 0.30 | 4.35 | 9.4 | 84 | 91 |
| Example 3-7 | 0.46 | 0.40 | 4.35 | 8.7 | 77 | 86 |
| Example 3-8 | 0.35 | 0.34 | 4.35 | 8.5 | 75 | 87 |
| Comp. Ex. 3-1 | 0.01 | 0.01 | 4.35 | 9.2 | 31 | 75 |
| Comp. Ex. 3-2 | 0.18 | 0.10 | 4.35 | 9.1 | 32 | 76 |
| Comp. Ex. 3-3 | 0.82 | 0.83 | 4.35 | 8.1 | 65 | 79 |
| Comp. Ex. 3-4 | 0.81 | 0.75 | 4.35 | 9.2 | 32 | 77 |
| Comp. Ex. 3-5 | 0.62 | 0.71 | 4.35 | 9.0 | 36 | 74 |
| Comp. Ex. 3-6 | 0.62 | 0.71 | 4.20 | 8.0 | 39 | 82 |
| Comp. Ex. 3-7 | 0.62 | 0.71 | 4.50 | 9.9 | 21 | 68 |
| Comp. Ex. 3-8 | 0.80 | 0.81 | 4.35 | 9.2 | 30 | 76 |
| Comp. Ex. 3-9 | 0.21 | 0.16 | 4.35 | 9.2 | 38 | 75 |
| Comp. Ex. 3-10 | 0.25 | 0.17 | 4.35 | 8.6 | 50 | 69 |

Notes:-
u.: uniform,
nu.: nonuniform,
pr.: present,
ab.: absent,
int.: interspersed

TABLE 4

|  | Base material | Coating material | Addition amounts |
|---|---|---|---|
| Example 3-1 | $LiCo_{0.98}Al_{0.01}Mg_{0.01}O_2$ | $Li_2CO_3 + NH_4H_2PO_4$ | Co:Li:P = 98:1:1 |
| Example 3-2 | $LiCo_{0.98}Al_{0.01}Mg_{0.01}O_2$ | $Li_2CO_3 + NH_4H_2PO_4$ | Co:Li:P = 98:1:1 |
| Example 3-3 | $LiCo_{0.98}Al_{0.01}Mg_{0.01}O_2$ | $Li_2CO_3 + NH_4H_2PO_4$ | Co:Li:P = 98:1:1 |
| Example 3-4 | $LiCo_{0.98}Al_{0.01}Mg_{0.01}O_2$ | $Li_2CO_3 + NH_4H_2PO_4$ | Co:Li:P = 98:1:1 |
| Example 3-5 | $LiCo_{0.95}Al_{0.01}Mg_{0.04}O_2$ | $Li_2CO_3 + NH_4H_2PO_4$ | Co:Li:P = 98:1:1 |
| Example 3-6 | $LiCo_{0.98}Al_{0.01}Mg_{0.02}O_2$ | $Li_2CO_3 + NH_4H_2PO_4$ | Co:Li:P = 98:1:1 |
| Example 3-7 | $LiCoO_2$ | $Li_2CO_3 + MgCO_3 + NH_4H_2PO_4$ | Co:Li:Mg:P = 100:1:2:1 |
| Example 3-8 | $LiCoO_2$ | $Ni(OH)_2, MnPO_4$ | Ni:Co:Mn = 5:2:3 |
| Comp. Ex. 3-1 | $LiCo_{0.98}Al_{0.01}Mg_{0.01}O_2$ | — | — |
| Comp. Ex. 3-2 | $LiCoO_2$ | $Li_2CO_3 + MgCO_3 + NH_4H_2PO_4$ | Co:Li:Mg:P = 100:1:0.5:1 |
| Comp. Ex. 3-3 | $LiCo_{0.98}Al_{0.01}Mg_{0.01}O_2$ | $Li_2CO_3 + NH_4H_2PO_4$ | Co:Li:P = 98:1:4 |
| Comp. Ex. 3-4 | $LiCo_{0.98}Al_{0.01}Mg_{0.01}O_2$ | $Li_2CO_3 + NH_4H_2PO_4$ | Co:Li:P = 98:1:1 |
| Comp. Ex. 3-5 | $LiCo_{0.98}Al_{0.01}Mg_{0.01}O_2$ | $Li_2CO_3 + NH_4H_2PO_4$ | Co:Li:P = 98:1:1 |
| Comp. Ex. 3-6 | $LiCo_{0.98}Al_{0.01}Mg_{0.01}O_2$ | $Li_2CO_3 + NH_4H_2PO_4$ | Co:Li:P = 98:1:1 |
| Comp. Ex. 3-7 | $LiCo_{0.98}Al_{0.01}Mg_{0.01}O_2$ | $Li_2CO_3 + NH_4H_2PO_4$ | Co:Li:P = 98:1:1 |
| Comp. Ex. 3-8 | $LiCo_{0.98}Al_{0.01}Mg_{0.01}O_2$ | $Li_2CO_3 + NH_4H_2PO_4$ | Co:Li:P = 98:1:1 |
| Comp. Ex. 3-9 | $LiCo_{0.98}Al_{0.01}Mg_{0.01}O_2$ | $Li_2CO_3 + NH_4H_2PO_4$ | Co:Li:P = 98:1:1 |
| Comp. Ex. 3-10 | $LiCoO_2$ | $Ni(OH)_2, MnPO_4$ | Ni:Co:Mn = 1:1:1 |

|  | Distr. States | | | | | |
|---|---|---|---|---|---|---|
|  | Mg | Mg conc. gradient | Surface | Molar fraction r (d = 0.01%) | Molar fraction r (d = 0.10%) | Voltage [V] |
| Example 3-1 | u. | pr. | P, int. | 0.46 | 0.25 | 4.35 |
| Example 3-2 | u. | pr. | P, int. | 0.46 | 0.25 | 4.20 |
| Example 3-3 | u. | pr. | P, int. | 0.46 | 0.25 | 4.50 |
| Example 3-4 | u. | pr. | P, int. | 0.38 | 0.16 | 4.35 |
| Example 3-5 | u. | pr. | P, int. | 0.86 | 0.44 | 4.35 |
| Example 3-6 | u. | pr. | P, int. | 0.56 | 0.25 | 4.35 |
| Example 3-7 | u. | pr. | P, int. | 0.55 | 0.44 | 4.35 |
| Example 3-8 | Ni, Mn, u. | pr. | P, int. | 0.52 | 0.33 | 4.35 |
| Comp. Ex. 3-1 | u. | ab. | X, ab. | 0.01 | 0.01 | 4.35 |
| Comp. Ex. 3-2 | un. | pr. | P, int. | 0.25 | 0.08 | 4.35 |
| Comp. Ex. 3-3 | u. | pr. | P, int. | 0.80 | 0.85 | 4.35 |
| Comp. Ex. 3-4 | u. | pr. | P, int. | 0.81 | 0.70 | 4.35 |

TABLE 4-continued

| | | | | | | |
|---|---|---|---|---|---|---|
| Comp. Ex. 3-5 | u. | pr. | P, int. | 0.55 | 0.75 | 4.35 |
| Comp. Ex. 3-6 | u. | pr. | P, int. | 0.55 | 0.75 | 4.20 |
| Comp. Ex. 3-7 | u. | pr. | P, int. | 0.55 | 0.75 | 4.50 |
| Comp. Ex. 3-8 | u. | pr. | P, int. | 0.82 | 0.79 | 4.35 |
| Comp. Ex. 3-9 | u. | pr. | P, int. | 0.31 | 0.14 | 4.35 |
| Comp. Ex. 3-10 | Ni, Mn, u. | pr. | P, int. | 0.30 | 0.15 | 4.35 |

Notes:-
u.: uniform,
nu.: nonuniform,
pr.: present,
ab.: absent,
int.: interspersed As is seen from the evaluation results, good capacity retention and high-temperature preservability could be realized with controlling decline of initial capacity in Examples 3-1 to 3-8. On the other hand, in Comparative Examples 3-1 to 3-10 these effects were not attained.

Molar fraction ratios r of the positive electrode active materials of Examples 3-1 to 3-8 fall within the range $0.20 \leq r \leq 0.80$ in the in the range that ratio d satisfies $0.02\% \leq d \leq 0.05\%$ were 0.21, 0.16 respectively. And they shows the tendency that molar ratio r decreases from the surface into the depth direction in the range where ratio d satisfies $0.020\% \leq d \leq 0.050\%$.

Molar fraction ratios r of the positive electrode active materials of Comparative Examples 3-1 to 3-2, 3-4, 3-9 to 3-10 is constant or decreases along the depth direction from the surface where ratio d(%) satisfies $0.02\% \leq d \leq 0.05\%$ in a certain range of depth, i.e., 10 to 100 nm from the surface. But molar fraction ratio r does not fall in the range of $0.20 \leq r \leq 0.80$ Molar fraction ratio r of Comparative Example 3-1 was not in the range of $0.20 \leq r \leq 0.80$ because coating material was not used. Molar fraction ratio r of Comparative Example 3-2 was not in the range of $0.20 \leq r \leq 0.80$ because mixing volumes of base material and coating materials are not appropriate. Molar fraction ratio r of Comparative Example 3-4 was not in the range of $0.20 \leq r \leq 0.80$ because second firing temperature was 750° C. Molar fraction ratio r of Comparative Example 3-9 was not in the range of $0.20 \leq r \leq 0.80$ because time of mechano-chemical procedure was 15 minutes, which was too short in comparison with Example 3-1. Molar fraction ratio r of Comparative Example 3-10 was not in the range of $0.20 \leq r \leq 0.80$ because mixing volumes of base material and coating materials are not appropriate.

Molar fraction ratios r of the positive electrode active materials of Comparative Examples 3-3 and 3-8 fall out of the range $0.20 \leq r \leq 0.80$ where ratio d (%) satisfies $0.02\% \leq d \leq 0.05\%$. And they show the tendency that molar ratio r increases from the surface into the depth direction in the range where ratio d satisfies $0.020\% \leq d \leq 0.050\%$ in a certain range of depth, i.e., 10 to 100 nm from the surface.

Molar fraction ratios r of the positive electrode active materials of Comparative Examples 3-3 fall out of the range $0.20 \leq r \leq 0.80$ because mixing volumes of base material and coating materials are not appropriate. Molar fraction ratios r of the positive electrode active materials of Comparative Examples 3-8 fall out of the range $0.20 \leq r \leq 0.80$ because second firing procedure is not done.

Molar fraction ratios r of the positive electrode active materials of Comparative Examples 3-5 to 3-7 fall within the range $0.20 \leq r \leq 0.80$. But they shows the tendency that molar fraction ratio r increase from the surface into the depth direction in the range where ratio d satisfies $0.020\% \leq d \leq 0.050\%$ in a certain range of depth, i.e., 10 to 100 nm from the surface.

Molar fraction ratios r of the positive electrode active materials of Comparative Examples 3-5 to 3-7 increase because temperature of the second firing procedure is 850° C.

As is shown above, good capacity retention and high-temperature preservability could be realized with controlling decline of initial capacity when Molar fraction ratios r fall within the range $0.20 \leq r \leq 0.80$ in the range where ratio d satisfies $0.020\% \leq d \leq 0.050\%$ in a certain range of depth from the surface.

As for preparing method of positive electrode active material, metallic element M2 is preferably drawn from the basic material to the surface as in Examples 3-1 to 3-6. The preparing method makes the processes simple, and the prepared material has more uniform distribution at the surface and well retains the structure, which improves capacity retention and high-temperature preservability.

As is seen from the evaluation results in table 4, positive electrode active material with ratio d out of the range $0.020\% \leq d \leq 0.050\%$ does not always improve capacity retention or high-temperature preservability even molar fraction rate r is in the range of $0.20 \leq r \leq 0.80$.

As for the analyzing method of the surface of the positive electrode active material, XPS: X-ray Photoelectron Spectroscopy and TOF-SIMS: Time-Of-Flight Secondary Ion Mass Spectroscopy has been used heretofore. Table 3 shows measured molar fraction ratio r where ratio d corresponding to the depth range along the direction of the depth detected by these method was 0.010%, which corresponding to the area of a few nm depth from the surface, and where ratio d corresponding to the depth range along the direction of the depth detected by this method was 0.100%, which corresponds to the area of more than 100 nm depth from the surface.

Examples 3-9

Nonaqueous Electrolyte secondary battery prepared as in Example 3-4 was broken down and positive electrode current collector was peeled from the electrode and binder was removed by immersing in NMP from the positive electrode active material, conductive agent was burned to obtain positive electrode active material. Molar fraction rate r at the ratio d=0.02% and 0.05% were 0.29 and 0.22 respectively.

Examples 3-10

Nonaqueous Electrolyte secondary battery prepared as in Example 3-5 was broken down and positive electrode current collector was peeled from the electrode and binder was removed by immersing in NMP from the positive electrode active material, conductive agent was burned to obtain positive electrode active material. Molar fraction rate r at the ratio d=0.02% and 0.05% were 0.79 and 0.53 respectively.

The structure of the positive electrode active material of the nonaqeuous electrolyte secondary cell and evaluation results of Examples 3-9 and 3-10 are shown in Table 5 below.

concentration was confirmed to be varying continuously from the surface toward the inside of the particle.

By using as a positive electrode active material the lithium-transition metal composite oxide particle s obtained as above, a nonaqueous electrolyte secondary cell was manufactured in

|  | Base material | Coating material | Addition amounts | Distr. States | | | Molar fraction r (d = 0.02%) | Molar fraction r (d = 0.05%) |
|---|---|---|---|---|---|---|---|---|
|  |  |  |  | Mg | Mg conc. gradient | Surface |  |  |
| Example 3-9 | $LiCo_{0.98}Al_{0.01}Mg_{0.01}O_2$ | $Li_2CO_3 + NH_4H_2PO_4$ | Co:Li:P = 98:1:1 | u. | pr. | P, int. | 0.29 | 0.22 |
| Example 3-10 | $LiCo_{0.95}Al_{0.01}Mg_{0.01}O_2$ | $Li_2CO_3 + NH_4H_2PO_4$ | Co:Li:P = 98:1:1 | u. | pr. | P, int. | 0.79 | 0.53 |

Notes:-
u.: uniform,
nu.: nonuniform,
pr.: present,
ab.: absent,
int.: interspersed Table 5 shows molar fraction rates r at the ratio d between 0.02% and 0.05% fall within the range of 0.20<r<0.80 when positive electrode active material was taken out form Nonaqueous electrolyte secondary cells.

Example 3-11

Positive electrode active material was prepared as follows.

Lithium Cobalt oxide $LiCO_{0.98}Al_{0.01}Mg_{0.01}O_2$ as the same as in Example 3-1 with average diameter of 13 μm measured by laser scattering method and ammonium phosphate dibse $NH_4H_2PO_4$ powdered by jet-mill into average diameter of 6 μm measured by laser scattering method were mixed in atomic ratio of Co:P=99:1.

The mixture was treated by mechano-chemical device for 1 hr. to deposit ammonium phosphate dibsse on the surface of Lithium Cobalt Oxide to obtain precursor before firing. The precursor was subjected to a temperature rise at a rate of 3° C./min, and was held at 900° C. for 3 hr, followed by slow cooling, to obtain a lithium-transition metal composite oxide. The lithium-transition metal composite oxide had magnesium (Mg) uniformly distributed at the surfaces of the lithium-cobalt composite oxide particles. Besides, the concentration of magnesium (Mg) was higher at the particle surfaces than in the inside of the particles, and lithium phosphate ($Li_3PO_4$) was interspersed on the particle surfaces.

Incidentally, the surface concentration gradient of Magnesium Mg was confirmed in detail. Molar fraction ratios r at ratio d=0.01%, 0.015%, 0.02%, 0.05% were 0.82, 0.73, 0.62, and 0.40 respectively.

The surface state of the obtained material was confirmed by observation of the obtained powder under SEM/EDX. Upon the observation uniform distribution of magnesium (Mg) on the particle surfaces and interspersing of phosphorus on the particle surfaces were confirmed. The particle was subjected to measurement of powder X-ray diffraction pattern by use of CuKα, a diffraction peak corresponding to $Li_3PO_4$ was confirmed in addition to a diffraction peak corresponding to $LiCoO_2$ having a laminar rock salt structure. In addition, magnesium concentration was confirmed by cutting a section of the lithium-transition metal composite oxide, and measuring the element distribution in the radial direction by Auger electron spectroscopy. Upon the measurement of the element distribution in the section of the particle, the magnesium the same manner as in Example 3-1. and the cell was subjected to evaluations of initial capacity, capacity retention and high-temperature preservability in the same manner as in Example 3-1.

Example 3-12

Positive electrode active material was prepared in the same manner as in Example 3-11 except that Lithium Cobalt oxide $LiCO_{0.98}Al_{0.01}Mg_{0.01}O_2$ with average diameter of 6 μm measured by laser scattering method and ammonium phosphate dibsse $NH_4H_2PO_4$ powdered by jet-mill into average diameter of 6 μm measured by laser scattering method were mixed in atomic ratio of Co:P=98.8:1.2.

Incidentally, the surface concentration gradient of Magnesium Mg was confirmed in detail. Molar fraction ratios r at ratio d=0.01%, 0.015%, 0.02%, 0.05% were 0.92, 0.85, 0.80, and 0.65 respectively.

By using as a positive electrode active material the lithium-transition metal composite oxide particle s obtained as above, a nonaqueous electrolyte secondary cell was manufactured in the same manner as in Example 1-1. And the cell was subjected to evaluations of initial capacity, capacity retention and high-temperature preservability in the same manner as in Example 3-11.

Example 3-13

Lithium Cobalt oxide $LiCO_{0.98}Al_{0.01}Mg_{0.01}O_2$ with average diameter of 6 μm measured by laser scattering method and ammonium sulfate 4 2 4 powdered by jet-mill into average diameter of 3 μm measured by laser scattering method were mixed in atomic ratio of Co:S=99:1. The mixture was treated by Planetary Mixer for 30 minutes to deposit ammonium sulfate on the surface of Lithium Cobalt oxide. Positive electrode active material was prepared in the same manner as in Example 3-11 except mentioned. Molar fraction ratios r at ratio d=0.01%, 0.015%, 0.02%, 0.05% were 0.80, 0.71, 0.58, and 0.38 respectively.

By using as a positive electrode active material the lithium-transition metal composite oxide particles obtained as above, a nonaqueous electrolyte secondary cell was manufactured in the same manner as in Example 3-11. and the cell was subjected to evaluations of initial capacity, capacity retention and high-temperature preservability in the same manner as in Example 3-11.

Example 3-14

Positive electrode active material was prepared in the same manner as in Example 3-11 except that Lithium Cobalt oxide with average diameter of 100 μm measured by laser scattering method and ammonium phosphate dibsse $NH_4H_2PO_4$ were mixed in atomic ratio of Co:P=99:1.

Incidentally, the surface concentration gradient of Magnesium Mg was confirmed in detail. Molar fraction ratios r at ratio d=0.01%, 0.015%, 0.02%, 0.05% were 0.62, 0.53, 0.44, and 0.25 respectively.

By using as a positive electrode active material the lithium-transition metal composite oxide particle s obtained as above, a nonaqueous electrolyte secondary cell was manufactured in the same manner as in Example 3-11. and the cell was subjected to evaluations of initial capacity, capacity retention and high-temperature preservability in the same manner as in Example 3-11.

Comparative Example 3-11

Positive electrode active material was prepared in the same manner as in Example 3-11 except that Lithium Cobalt oxide with average diameter of 6 μm measured by laser scattering method and ammonium phosphate dibsase $NH_4H_2PO_4$ were mixed in atomic ratio of Co:P=95:5.

Incidentally, the surface concentration gradient of Magnesium Mg was confirmed in detail. Molar fraction ratios r at ratio d=0.01%, 0.015%, 0.02%, 0.05% were 0.98, 0.95, 0.92, and 0.85 respectively.

By using as a positive electrode active material the lithium-transition metal composite oxide particle s obtained as above, a nonaqueous electrolyte secondary cell was manufactured in the same manner as in Example 3-11. and the cell was subjected to evaluations of initial capacity, capacity retention and high-temperature preservability in the same manner as in Example 3-11.

Comparative Example 3-12

Positive electrode active material was prepared in the same manner as in Example 3-11 except that Lithium Cobalt oxide with average diameter of 6 μm measured by laser scattering method and ammonium sulfate $(NH4)2SO4$ having average diameter of 6 μm measured by laser scattering method were mixed in atomic ratio of Co:S=99:1.

Incidentally, the surface concentration gradient of Magnesium Mg was confirmed in detail. Molar fraction ratios r at ratio d=0.01%, 0.015%, 0.02%, 0.05% were 0.33, 0.25, 0.20, and 0.15 respectively.

By using as a positive electrode active material the lithium-transition metal composite oxide particle s obtained as above, a nonaqueous electrolyte secondary cell was manufactured in the same manner as in Example 3-13. and the cell was subjected to evaluations of initial capacity, capacity retention and high-temperature preservability in the same manner as in Example 3-13.

The structure of the positive electrode active material of the nonaqeuous electrolyte secondary cell and evaluation results of Examples 3-11 to 3-14, Comparative Examples 3-11 to 3-12 are shown in Table 6 below.

TABLE 6

| | Base material | Coating material | Addition amounts | Distr. States | | | Molar fraction r (d = 0.01%) |
|---|---|---|---|---|---|---|---|
| | | | | Mg | Mg conc. gradient | Surface | |
| Ex. 3-11 | $LiCo_{0.98}Al_{0.01}Mg_{0.01}O_2$ | $NH_4H_2PO_4$ | Co:P = 99:1 | u. | pr. | P, int. | 0.82 |
| Ex. 3-12 | $LiCo_{0.98}Al_{0.01}Mg_{0.01}O_2$ | $NH_4H_2PO_4$ | Co:P = 98.8:1.2 | u. | pr. | P, int. | 0.92 |
| Ex. 3-13 | $LiCo_{0.98}Al_{0.01}Mg_{0.01}O_2$ | $(NH_4)_2SO_4$ | Co:S = 99:1 | u. | pr. | S, int. | 0.80 |
| Ex. 3-14 | $LiCo_{0.98}Al_{0.01}Mg_{0.01}O_2$ | $NH_4H_2PO_4$ | Co:P = 99:1 | u. | pr. | P, int. | 0.62 |
| Comp. Ex 3-11 | $LiCo_{0.98}Al_{0.01}Mg_{0.01}O_2$ | $NH_4H_2PO_4$ | Co:P = 95:5 | u. | pr. | P, int. | 0.98 |
| Comp. Ex. 3-12 | $LiCo_{0.98}Al_{0.01}Mg_{0.01}O_2$ | $(NH_4)_2SO_4$ | Co:S = 99:1 | u. | pr. | S, int. | 0.33 |

| | Molar fraction r (d = 0.015%) | Molar fraction r (d = 0.02%) | Molar fraction r (d = 0.05%) | Voltage [V] | Initial discharge capacity [Wh] | Capacity retention [%] | High-temperature preservability [%] |
|---|---|---|---|---|---|---|---|
| Ex. 3-11 | 0.73 | 0.62 | 0.40 | 4.35 | 10.00 | 90 | 95 |
| Ex. 3-12 | 0.85 | 0.80 | 0.65 | 4.35 | 10.10 | 92 | 96 |
| Ex. 3-13 | 0.71 | 0.58 | 0.38 | 4.35 | 10.00 | 90 | 96 |
| Ex. 3-14 | 0.53 | 0.44 | 0.25 | 4.35 | 9.80 | 72 | 83 |

TABLE 6-continued

| | | | | | | | |
|---|---|---|---|---|---|---|---|
| Comp. Ex 3-11 | 0.95 | 0.92 | 0.85 | 4.35 | 8.70 | 85 | 90 |
| Comp. Ex. 3-12 | 0.25 | 0.20 | 0.15 | 4.35 | 10.00 | 60 | 65 |

Notes:-
u.: uniform,
nu.: nonuniform,
pr.: present,
ab.: absent,
int.: interspersed As is seen from the evaluation results shown in table 6, molar fraction ratios r of the positive electrode active material of Examples 3-11, 3-12, 3-13 fall within the range 0.20≤r≤0.80 in the range that ratio d satisfies 0.02%≤d≤0.05%. And at the same time, molar fraction ratios r fall within the range 0.55≤r<1.0 in the range that ratio d satisfies 0.01%≤d<0.02%. These Examples perform very improved retention capacity and high-temperature preservability with controlling their decline in discharge capacity.

Molar fraction ratio r of the positive electrode active material of Examples 3-14 falls within the range 0.20≤r≤0.80 in the range that ratio d satisfies 0.02%≤d≤0.05%. But molar fraction ratios r do not fall within the range 0.55≤r<1.0 in the range that ratio d satisfies 0.01%≤d<0.02%. Example 3-14 could not attain highly improved retention capacity or high-temperature preservability. It is because of the average diameter of coating material ammonium phosphate dibase being 100 μm, which disturbs ammonium phosphate dibase from well mixed state to make good coating state on the surface of the base material.

Molar fraction ratio r of the positive electrode active material of Comparative Example 3-11 falls within the range 0.55≤r<1.0 in the range that ratio d satisfies 0.01%≤d<0.02%. But molar fraction ratios r fall out of the range 0.20≤r≤0.80 in the range that ratio d satisfies 0.02%≤d≤0.05%. This is because too much coating materials make too thin coatings, which decreases the positive electrode active materials contributing to charge-discharge capacity. Consequently, initial discharge capacity by Comparative Example 3-11 is small.

Molar fraction ratio r of the positive electrode active material of Comparative Example 3-12 falls out of the range 0.55≤r<1.0 in the range that ratio d satisfies 0.01%≤d<0.02%. This is because coating materials were not well mixed with base material and could not make good coatings. Therefore, good improvement in retention capacity and high-temperature preservability could not be attained by Comparative Example 3-12.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. A positive electrode active material prepared by:
mixing a lithium-containing compound, a compound containing a transition metal M1 to be involved in a solid solution, and a compound containing a metallic element M2 different from the transition metal M1, and firing the mixture to form composite oxide particles having a laminar rock salt structure and an average composition represented by Chemical formula 1:

$Li_aA_bM_{1-b}O_c$  Chemical formula 1 where A represents at least one element selected from the group consisting of nickel (Ni), cobalt (Co), manganese (Mn) and iron (Fe); M represents at least one element selected from the group consisting of manganese (Mn), magnesium (Mg), aluminum (Al), nickel (Ni), boron (B), titanium (Ti), cobalt (Co) and iron (Fe); and a, b and c are numbers in the ranges of 0.2≤a≤1.4, 0≤b≤1.0, and 1.8≤c≤2.2;
depositing a compound containing at least one element selected from among sulfur (S), phosphorus (P) and fluorine (F) on surfaces of the composite oxide particles; and
firing the composite oxide particles with the compound containing at least one element selected from among sulfur (S), phosphorus (P) and fluorine (F) deposited thereon;
whereby each of the composite oxide particles is provided with a concentration gradient such that the concentration of the metallic element M2 increases from the center toward the surface of the composite oxide particle, and
at least one element selected from among sulfur (S), phosphorus (P) and fluorine (F) is made present in the form of being aggregated at the surfaces of the composite oxide particles.

2. The positive electrode active material according to claim 1, wherein the transition metal M1 is at least selected one element selected from the group consisting of nickel (Ni), cobalt (Co), manganese (Mn) and iron (Fe).

3. The positive electrode active material according to claim 1, wherein the metallic element M2 is at least one element selected from among manganese (Mn), magnesium (Mg), aluminum (Al), nickel (Ni), boron (B), titanium (Ti), cobalt (Co) and iron (Fe).

4. The positive electrode active material according to claim 1, wherein the firing of the composite oxide particles with the compound containing at least one element selected from among sulfur (S), phosphorus (P) and fluorine (F) deposited thereon is conducted in the co-existence of a lithium-containing compound.

5. The positive electrode active material according to claim 1, wherein the compound containing at least one element selected from among sulfur (S), phosphorus (P) and fluorine (F) or the thermally decomposed product of said compound has a melting point of 70° C. or more and 600° C. or less.

6. The positive active material according to claim 1, wherein the compound containing at least one element selected from among sulfur (S), phosphorus (P) and fluorine (F) or the thermally decomposed product of said compound preferably has an average diameter of 30 μm or less.

7. A positive electrode comprising a positive electrode material which is prepared by:
mixing a lithium-containing compound, a compound containing a transition metal M1 to be put into a solid solution, and a compound containing a metallic element M2 different from the transition metal M1, and firing the mixture to form composite oxide particles having a laminar rock salt structure and an average composition represented by Chemical formula 1:

$$Li_aA_bM_{1-b}O_c \qquad \text{Chemical formula 1}$$

where A represents at least one element selected from the group consisting of nickel (Ni), cobalt (Co), manganese (Mn) and iron (Fe); M represents at least one element selected from the group consisting of manganese (Mn), magnesium (Mg), aluminum (Al), nickel (Ni), boron (B), titanium (Ti), cobalt (Co) and iron (Fe); and a, b and c are numbers in the ranges of $0.2 \le a \le 1.4$, $0 \le b \le 1.0$, and $1.8 \le c \le 2.2$;

depositing a compound containing at least one element selected from among sulfur (S), phosphorus (P) and fluorine (F) on surfaces of the composite oxide particles; and firing the composite oxide particles with the compound containing at least one element selected from among sulfur (S), phosphorus (P) and fluorine (F) deposited thereon;

whereby each of the composite oxide particles is provided with a concentration gradient such that the concentration of the metallic element M2 increases from the center toward the surface of the composite oxide particle, and at least one element selected from among sulfur (S), phosphorus (P) and fluorine (F) is made present in the form of being aggregated at the surfaces of the composite oxide particles.

8. A nonaqueous electrolyte cell comprising a positive electrode, a negative electrode, and an electrolyte,
wherein the positive electrode include a positive electrode active material which is prepared by:
mixing a lithium-containing compound, a compound containing a transition metal M1 to be put into a solid solution, and a compound containing a metallic element M2 different from the transition metal M1, and firing the mixture to form composite oxide particles having a laminar rock salt structure and an average composition represented by Chemical formula 1:

$$Li_aA_bM_{1-b}O_c \qquad \text{Chemical formula 1}$$

where A represents at least one element selected from the group consisting of nickel (Ni), cobalt (Co), manganese (Mn) and iron (Fe); M represents at least one element selected from the group consisting of manganese (Mn), magnesium (Mg), aluminum (Al), nickel (Ni), boron (B), titanium (Ti), cobalt (Co) and iron (Fe); and a, b and c are numbers in the ranges of $0.2 \le a \le 1.4$, $0 \le b \le 1.0$, and $1.8 \le c \le 2.2$;

depositing a compound containing at least one element selected from among sulfur (S), phosphorus (P) and fluorine (F) on surfaces of the composite oxide particles; and firing the composite oxide particles with the compound containing at least one element selected from among sulfur (S), phosphorus (P) and fluorine (F) deposited thereon;

whereby each of the composite oxide particles is provided with a concentration gradient such that the concentration of the metallic element M2 increases from the center toward the surface of the composite oxide particle, and at least one element selected from among sulfur (S), phosphorus (P) and fluorine (F) is made present in the form of being aggregated at the surfaces of the composite oxide particles.

9. A method of preparing a positive electrode active material comprising:
mixing a lithium-containing compound, a compound containing a transition metal M1 to be put into a solid solution, and a compound containing a metallic element M2 different from the transition metal M1, and firing the mixture to form composite oxide particles having a laminar rock salt structure and an average composition represented by Chemical formula 1:

$$Li_aA_bM_{1-b}O_c \qquad \text{Chemical formula 1}$$

where A represents at least one element selected from the group consisting of nickel (Ni), cobalt (Co), manganese (Mn) and iron (Fe); M represents at least one element selected from the group consisting of manganese (Mn), magnesium (Mg), aluminum (Al), nickel (Ni), boron (B), titanium (Ti), cobalt (Co) and iron (Fe); and a, b and c are numbers in the ranges of $0.2 \le a \le 1.4$, $0 \le b \le 1.0$, and $1.8 \le c \le 2.2$;

depositing a compound containing at least one element selected from among sulfur (S), phosphorus (P) and fluorine (F) on surfaces of the composite oxide particles; and firing the composite oxide particles with the compound containing at least one element selected from among sulfur (S), phosphorus (P) and fluorine (F) deposited thereon;

whereby each of the composite oxide particles is provided with a concentration gradient such that the concentration of the metallic element M2 increases from the center toward the surface of the composite oxide particle, and at least one element selected from among sulfur (S), phosphorus (P) and fluorine (F) is made present in the form of being aggregated at the surfaces of the composite oxide particles.

10. The method of preparing a positive electrode active material according claim 9; wherein during firing, the compound containing at least one element selected from among sulfur (S), phosphorus (P) and fluorine (F) is melted or thermally decomposed and melted, and the melted compound uniformly coats the surface of the composite oxide particles.

11. The method of preparing a positive electrode active material according claim 10, wherein cation from the deposited compound containing at least one element selected from among sulfur (S), phosphorus (P) and fluorine (F) is eliminated during firing, and anion from the deposited compound containing at least one element selected from among sulfur (S), phosphorus (P) and fluorine (F) reacts with an element included in the composite oxide particle.

12. The positive electrode active material according to claim 1,
wherein a ratio d(%)=[(mass of the transition metal M1)+ (mass of the metallic element M2)]/(mass of whole particles),
wherein a molar fraction r=(mass of the metallic element M2)/[(mass of the transition metal M1)+(mass of the metallic element M2)], and
wherein the molar fraction r(%) satisfies the formula $0.20 \le r \le 0.80$ in the range where the ratio d(%) from the surface to a certain depth satisfies $0.020 \le d \le 0.050$.

13. A positive electrode active material comprising:
a composite oxide particle; and
a compound including at least one element selected from the group consisting of sulfur (S), phosphorus (P) and fluorine (F) on surfaces of the composite oxide particle,
wherein the composite oxide particle has a laminar rock salt structure and an average composition including a transition metal M1 and a metallic element M2 different from the transition metal M1, and is represented by Chemical formula 1:

$$Li_aA_bM_{1-b}O_c \qquad \text{Chemical formula 1}$$

where A represents at least one element selected from the group consisting of nickel (Ni), cobalt (Co), manganese (Mn) and iron (Fe); M represents at least one element selected from the group consisting of manganese (Mn), magnesium (Mg), aluminum (Al), nickel (Ni), boron (B), titanium (Ti), cobalt (Co) and iron (Fe); and a, b and c are numbers in the ranges of $0.2 \leq a \leq 1.4$, $0 \leq b \leq 1.0$, and $1.8 \leq c \leq 2.2$, and wherein the composite oxide particle has a concentration gradient such that the concentration of the metallic element M2 increases from the center toward the surface of the composite oxide particle.

14. The positive electrode active material according to claim 13, wherein the transition metal M1 is at least selected one element selected from the group consisting of nickel (Ni), cobalt (Co), manganese (Mn) and iron (Fe).

15. The positive electrode active material according to claim 13, wherein the metallic element M2 is at least one element selected the group consisting of manganese (Mn), magnesium (Mg), aluminum (Al), nickel (Ni), boron (B), titanium (Ti), cobalt (Co) and iron (Fe).

16. The positive electrode active material according to claim 13, wherein the compound, containing at least one element selected from the group consisting of sulfur (S), phosphorus (P) and fluorine (F), or a thermally decomposed product of the compound, has a melting point of 70° C. or more and 600° C. or less.

17. The positive active material according to claim 13, wherein the compound, containing at least one element selected from the group consisting of sulfur (S), phosphorus (P) and fluorine (F), or a thermally decomposed product of the compound, has an average diameter of 30 μm or less.

18. The positive active material according to claim 13, wherein the at least one element of the compound, selected from the group consisting of sulfur (S), phosphorus (P) and fluorine (F), is aggregated on the surfaces of the composite oxide particle.

19. The positive active material according to claim 13, wherein A includes Ni and Co.

20. The positive electrode active material according to claim 13,
wherein a ratio d(%)=[(mass of the transition metal M1)+(mass of the metallic element M2)]/(mass of whole particles),
wherein a molar fraction r=(mass of the metallic element M2)/[(mass of the transition metal M1)+(mass of the metallic element M2)], and
wherein the molar fraction r(%) satisfies the formula $0.20 \leq r \leq 0.80$ in the range where the ratio d(%) from the surface to a certain depth satisfies $0.020 \leq d \leq 0.050$.

* * * * *